(12) United States Patent
Stadelmeier et al.

(10) Patent No.: US 8,194,529 B2
(45) Date of Patent: Jun. 5, 2012

(54) FRAME AND DATA PATTERN STRUCTURE FOR MULTI-CARRIER SYSTEMS

(75) Inventors: Lothar Stadelmeier, Stuttgart (DE); Dietmar Schill, Winnenden (DE); Joerg Robert, Vreden (DE)

(73) Assignee: Sony Corporation, Tokyo (JP)

( * ) Notice: Subject to any disclaimer, the term of this patent is extended or adjusted under 35 U.S.C. 154(b) by 140 days.

(21) Appl. No.: 12/545,205

(22) Filed: Aug. 21, 2009

(65) Prior Publication Data

US 2010/0061398 A1    Mar. 11, 2010

(30) Foreign Application Priority Data

| Sep. 8, 2008 | (EP) | 08163903 |
|---|---|---|
| Sep. 8, 2008 | (EP) | 08163904 |
| Dec. 11, 2008 | (EP) | 08171321 |
| Dec. 11, 2008 | (EP) | 08171323 |

(51) Int. Cl.
   *H04J 11/00*    (2006.01)

(52) U.S. Cl. ........ 370/203; 370/204; 370/206; 370/208; 370/210; 375/130; 375/259; 375/260

(58) Field of Classification Search .......... 370/203–211, 370/430; 375/130, 259–260, 268
See application file for complete search history.

(56) References Cited

U.S. PATENT DOCUMENTS

| 6,172,993 B1 | 1/2001 | Kim et al. | |
|---|---|---|---|
| 6,470,030 B1 * | 10/2002 | Park et al. | 370/480 |
| 6,760,362 B2 * | 7/2004 | Patel et al. | 375/147 |
| 6,952,182 B2 * | 10/2005 | Spilker et al. | 342/464 |
| 7,039,004 B2 * | 5/2006 | Sun et al. | 370/208 |
| 7,075,949 B2 * | 7/2006 | Okada et al. | 370/510 |

(Continued)

FOREIGN PATENT DOCUMENTS

EP    1 650 921 A2    4/2006

(Continued)

OTHER PUBLICATIONS

U.S. Appl. No. 12/689,401, filed Jan. 19, 2010, Robert, et al.

(Continued)

*Primary Examiner* — Kwang B Yao
*Assistant Examiner* — Benjamin H Elliott, IV
(74) *Attorney, Agent, or Firm* — Oblon, Spivak, McClelland, Maier & Neustadt, L.L.P.

(57) ABSTRACT

The present invention relates to a transmitting apparatus (54) for transmitting signals in a multi carrier system on the basis of a frame structure, each frame comprising at least one signalling pattern and one or more data patterns, said transmitting apparatus comprising frame forming means (59) adapted to arrange signalling data in said at least one signalling pattern in a frame, and to arrange data and at least one pilot signal in said one or more data patterns in a frame, whereby the length of each of said one or more data patterns in the frequency direction is equal to or a multiple of a minimum data pattern length, transforming means (60) adapted to transform said at least one signalling pattern and said one or more data patterns from the frequency domain into the time domain in order to generate a time domain transmission signal, and transmitting means (61) adapted to transmit said time domain transmission signal. The present invention further relates to a corresponding transmitting method and a frame structure as well as a receiving apparatus and method, as well as a transmitting and receiving system and method.

19 Claims, 8 Drawing Sheets

U.S. PATENT DOCUMENTS

Figure 1:
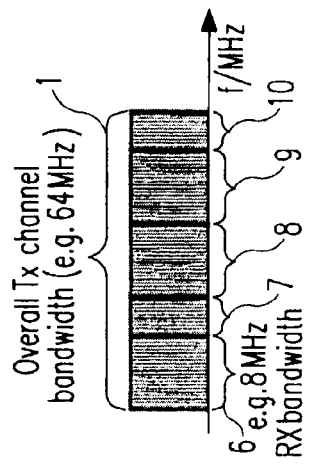

| | | | |
|---|---|---|---|
| 7,098,967 B2 * | 8/2006 | Kanno et al. | 348/726 |
| 7,099,270 B2 * | 8/2006 | Yamaguchi | 370/208 |
| 7,158,013 B2 | 1/2007 | Schwager et al. | |
| 7,233,625 B2 * | 6/2007 | Ma et al. | 375/260 |
| 7,260,055 B2 * | 8/2007 | Wang et al. | 370/208 |
| 7,304,939 B2 * | 12/2007 | Steer et al. | 370/208 |
| 7,336,600 B2 * | 2/2008 | Feng et al. | 370/208 |
| 7,349,436 B2 * | 3/2008 | Maltsev et al. | 370/471 |
| 7,366,262 B2 * | 4/2008 | Shin et al. | 375/344 |
| 7,430,193 B2 * | 9/2008 | Kim et al. | 370/338 |
| 7,492,699 B2 * | 2/2009 | Cho | 370/203 |
| 7,639,660 B2 * | 12/2009 | Kim et al. | 370/343 |
| 7,787,431 B2 * | 8/2010 | Li et al. | 370/343 |
| 7,792,201 B2 * | 9/2010 | Lee et al. | 375/260 |
| 7,903,691 B2 * | 3/2011 | Hwang et al. | 370/491 |
| 2001/0020287 A1 * | 9/2001 | Yano et al. | 714/780 |
| 2003/0043732 A1 * | 3/2003 | Walton et al. | 370/208 |
| 2004/0013084 A1 * | 1/2004 | Thomas et al. | 370/210 |
| 2004/0180635 A1 * | 9/2004 | Choi et al. | 455/113 |
| 2004/0257979 A1 * | 12/2004 | Ro et al. | 370/208 |
| 2006/0013285 A1 * | 1/2006 | Kobayashi et al. | 375/132 |
| 2006/0088112 A1 * | 4/2006 | Das et al. | 375/260 |
| 2006/0207616 A1 | 9/2006 | Hapke et al. | |
| 2007/0153931 A1 * | 7/2007 | Lee et al. | 375/260 |
| 2007/0268975 A1 | 11/2007 | Yoon et al. | |
| 2007/0297323 A1 * | 12/2007 | Seki | 370/208 |
| 2008/0043858 A1 * | 2/2008 | Lim et al. | 375/260 |
| 2008/0084940 A1 * | 4/2008 | Hou | 375/260 |
| 2008/0095255 A1 | 4/2008 | Tanaka et al. | |
| 2008/0107011 A1 | 5/2008 | Yang | |
| 2008/0137761 A1 * | 6/2008 | Stadelmeier et al. | 375/260 |
| 2008/0159436 A1 * | 7/2008 | Cho et al. | 375/299 |
| 2008/0253279 A1 * | 10/2008 | Ma et al. | 370/206 |
| 2009/0052427 A1 * | 2/2009 | Oketani et al. | 370/347 |
| 2009/0109948 A1 * | 4/2009 | Bauernfeind | 370/343 |
| 2009/0116374 A1 * | 5/2009 | Henriksson et al. | 370/203 |
| 2009/0135802 A1 * | 5/2009 | Haga et al. | 370/350 |
| 2009/0154547 A1 * | 6/2009 | Yousef | 375/240.01 |
| 2009/0161652 A1 * | 6/2009 | Chang et al. | 370/350 |
| 2009/0161780 A1 | 6/2009 | Schneider et al. | |
| 2009/0161784 A1 | 6/2009 | Stadelmeier et al. | |
| 2009/0168909 A1 | 7/2009 | Stadelmeier et al. | |
| 2009/0296843 A1 * | 12/2009 | Gu et al. | 375/262 |
| 2009/0304099 A1 | 12/2009 | Waller et al. | |
| 2010/0034219 A1 * | 2/2010 | Stadelmeier et al. | 370/478 |
| 2010/0061398 A1 * | 3/2010 | Stadelmeier et al. | 370/465 |
| 2010/0135316 A1 * | 6/2010 | Atungsiri et al. | 370/436 |

FOREIGN PATENT DOCUMENTS

| | | | |
|---|---|---|---|
| EP | 1650921 A2 * | 4/2006 | |

OTHER PUBLICATIONS

Digital Video Broadcasting (DVB); "Second Generation Framing Structure, Channel Coding and Modulation Systems for Broadcasting, Interactive Services, News Gathering and Other Broadband Satellite Applications (DVB-S2)", ETSI EN 302 307 (V1.2.1), European Standard (Telecommunications Series), Aug. 2009, 78 pages.

Digital Video Broadcasting (DVB); "Frame Structure Channel Coding and Modulation for a Second Generation Digital Terrestrial Television Broadcasting System (DVB-T2)", ETSI EN 302 755 (V1.1.1), European Standard (Telecommunications Series), Sep. 2009, 167 pages.

Digital Video Broadcasting (DVB); "Framing Structure, Channel Coding and Modulation for Digital Terrestrial Television", ETSI EN 300 744 (V1.5.1), European Standard (Telecommunications Series), Nov. 2004, 64 pages.

"Data Over Cable Service Interface Specifications DOCSIS 3.0", Physical Layer Specification CM-SP-PHYv3.0-I08-090121, Jan. 21, 2009, 169 pages.

"Transmission System for Digital Terrestrial Television Broadcasting", ARIB Standard, ARIB STD-B31 Version 1.6, Association of Radio Industries and Businesses, Nov. 30, 2005, 172 pages.

Michael Speth, et al., "Optimum Receiver Design for OFDM-Based Broadband Transmission—Part II: A Case Study", IEEE Transactions on Communications, vol. 49, No. 4, Apr. 2001, pp. 571-578.

Stefan H. Müller-Weinfurtner, "OFDM for Wireless Communications: Nyquist Windowing, Peak-Power Reduction, and Synchronization", 2000, ISBN 3-8265-7658-6,117 pages.

U.S. Appl. No. 12/273,151, filed Nov. 18, 2008, Schneider, et al.
U.S. Appl. No. 12/436,526, filed May 6, 2009, Stadelmeier, et al.
U.S. Appl. No. 12/436,980, filed May 7, 2009, Stadelmeier, et al.
U.S. Appl. No. 12/437,161, filed May 7, 2009, Stadelmeier, et al.
U.S. Appl. No. 12/499,456, filed Jul. 8, 2009, Stadelmeier, et al.
U.S. Appl. No. 12/563,772, filed Sep. 21, 2009, Atungsiri, et al.

* cited by examiner

FRAME AND DATA PATTERN STRUCTURE FOR MULTI-CARRIER SYSTEMS

The present invention is directed to a new frame and data pattern structure for multi-carrier systems.

The present invention is hereby mainly directed (but not limited) to broadcast systems, such as for example cable based or terrestrial digital broadcast systems, in which content data, signalling data, pilot signals and so forth are mapped on to a plurality of frequency carriers, which are then transmitted in a given overall or complete transmission bandwidth. The receiver typically tunes to a partial channel (part of the overall transmission bandwidth) out of the complete channel bandwidth (sometimes called segmented reception) in order to receive only the content data which are necessary or wanted by the respective receiver. For example, in the ISDB-T standard, the overall channel bandwidth is hereby divided into 13 fixed segments of an equal length (equal number of frequency carriers).

The object of the present invention is to provide a transmitting apparatus and method, as well as a signal structure for a multi-carrier system, which allow a flexible tuning to any required part of the transmission bandwidth and which has a low overhead.

The above object is achieved by a transmitting apparatus which is adapted to transmit signals in a multicarrier system on the basis of a frame structure, each frame comprising at least one signalling pattern and one or more data patterns, said transmitting apparatus comprising frame forming means adapted to arrange signalling data in said at least one signalling pattern in a frame, and to arrange data and at least one pilot signal in said one or more data patterns in a frame, whereby the length of each of said one or more data patterns in the frequency direction is equal to or a multiple of a minimum data pattern length, transforming means adapted to transform said at least one signalling pattern and said one or more data patterns from the frequency domain into the time domain in order to generate a time domain transmission signal and transmitting means adapted to transmit said time domain transmission signal.

The above object is further achieved by a transmitting method which is adapted to transmit signals in a multicarrier system on the basis of a frame structure, each frame comprising at least one signalling pattern and one or more data patterns, comprising the steps of arranging signalling data in said at least one signalling pattern in a frame, arranging data and at least one pilot signal in said one or more data patterns in a frame, whereby the length of each of said one or more data patterns in the frequency direction is equal to a multiple of minimum data pattern length, transforming said at least one signalling pattern and said one or more data patterns from the frequency domain into the time domain in order to generate a time domain transmission signal, and transmitting said time domain transmission signals.

The above object is further achieved by a frame pattern for a multicarrier system comprising at least one signalling pattern and one or more data patterns, whereby data and at least one pilot signal are arranged in each of said one or more data patterns in the frame, and wherein the length of each of said one or more data patterns in the frequency direction is equal to or a multiple of a minimum data pattern length.

The object of the present invention is further to provide a receiving apparatus and method, as well as a transmitting and receiving system and method, which allow a flexible tuning to any required part of the transmission bandwidth and which has a low overhead.

The above object is achieved by a receiving apparatus for receiving signals in a multi carrier system on the basis of a frame structure in a transmission bandwidth, each frame comprising one or more data patterns with data and pilot signals, whereby the length of each of said one or more data patterns in the frequency direction is equal to or a multiple of a minimum data pattern length, said receiving apparatus comprising receiving means adapted to be tuned to and to receive a selected part of said transmission bandwidth, said selected part of said transmission bandwidth covering at least one data pattern to be received, channel estimation means adapted to perform a channel estimation on the basis of pilot signals comprised in a received data pattern and data de-mapping means adapted to de-map data from frequency carriers of a received data pattern on the basis of the result of said channel estimation.

The above object is further achieved by a receiving method for receiving signals in a multi carrier system on the basis of a frame structure in a transmission bandwidth, each frame comprising one or more data patterns with data and pilot signals, whereby the length of each of said one or more data patterns in the frequency direction is equal to or a multiple of a minimum data pattern length, comprising the steps of receiving a selected part of said transmission bandwidth, said selected part of said transmission bandwidth covering at least one data pattern to be received, performing a channel estimation on the basis of pilot signals comprised in a received data pattern, and de-mapping data from frequency carriers of a received data pattern on the basis of the result of said channel estimation.

The above object is further achieved by a system for transmitting and receiving signals, comprising a transmitting apparatus for transmitting signals in a multi carrier system on the basis of a frame structure, each frame comprising at least one signalling pattern and one or more data patterns, said transmitting apparatus comprising frame forming means adapted to arrange signalling data in said at least one signalling pattern in a frame, and to arrange data and at least one pilot signal in said one or more data patterns in a frame, whereby the length each of said one or more data patterns in the frequency direction is equal to or a multiple of a minimum data pattern length, transforming means adapted to transform said at least one signalling pattern and said one or more data pattern from the frequency domain into the time domain in order to generate a time domain transmission signal, and transmitting means adapted to transmit said time domain transmission signal, said system further comprising a receiving apparatus according to present invention adapted to receive said time domain transmission signal from said transmitting apparatus.

The above object is further achieved by a method for transmitting and receiving signals, comprising a transmitting method for transmitting signals in a multi carrier system on the basis of a frame structure, each frame comprising at least one signalling pattern and one or more data patterns, comprising the steps of arranging signalling data in said at least one signalling pattern in a frame, arranging data and at least one pilot signal in said one or more data patterns in a frame, whereby the length each of said one or more data patterns in the frequency direction is equal to or a multiple of a minimum data pattern length, transforming said at least one signalling pattern and said one or more data pattern from the frequency domain into the time domain in order to generate a time domain transmission signal, and transmitting said time domain transmission signal, said method further comprising a receiving method according to the present invention adapted to receive said time domain transmission signal. Advantageous features are defined in the dependent claims.

The present invention therefore suggests a multi-carrier system which uses a frame structure or frame pattern in the frequency domain as well as in the time domain. In the frequency domain, each frame comprises at least one signalling pattern, which carries signalling data. The at least one signalling pattern may have additional pilot signals. Alternatively, each frame could have a dedicated training sequence or pattern which is arranged before (in time) the at least one signalling pattern, whereby the training sequence or pattern carries exclusively pilot signals. In this case, the at least one signalling pattern does not need (but can have) pilot signals. Further, each frame comprises one or more data patterns which follow the at least one signalling pattern in time in each frame pattern. Hereby, the at least one data pattern depends on a minimum data pattern length (in the frequency direction), namely is equal to one or a multiple of a minimum data pattern length. Thus, in case that two or more or a plurality of data patterns is provided in a frame, the data patterns could have different lengths. However, the length of the data patterns depends on the minimum data pattern length as stated. Therefore, although the length of the data patterns is or may be variable, the overhead is reduced, i.e. the amount of signalling data which need to be transmitted from a transmitter side to a receiving side is reduced as compared to a system in which the data pattern length is completely variable and can be set to any desired value. Further, according to the present invention, the one or more data patterns of a frame in the frequency domain comprise at least one pilot signal arranged among said data of the data pattern. The at least one pilot signal in each data pattern enables the receiving side to perform a fine channel estimation for the frequency carriers carrying the data in the data patterns, in a simple way since the location of the pilot signal in the time/frequency grid of the frequency domain is known to the receiver.

After a conversion into the time domain, in the resulting time domain signal, each frame then comprises one (or more) respective signalling symbol(s) (eventually preceded by training symbol(s)) as well as one or more data symbols. Each frame pattern covers the entire or overall transmission bandwidth in the frequency direction. Since each data pattern is equal to one or a multiple of the minimum data pattern length, the overall transmission bandwidth may be a multiple of the minimum data pattern length. The receiving apparatus can be freely, flexibly and quickly tuned to any wanted part of the transmission bandwidth, provided that the part of the transmission bandwidth to which the receiving apparatus can be tuned has at least the length of one of the signalling patterns. Hereby, the receiving apparatus is always able to receive the signalling data of an entire signalling pattern, so that on the basis and using the signalling data comprising the physical layer information necessary for the receipt of the succeeding data patterns, the data patterns can be received in the receiving apparatus. In case that each signalling pattern not only comprises signalling data, but also pilot signals, it is not necessary to provide dedicated preambles or training patterns consisting only of pilot signals, since the pilot signals comprised in the signalling pattern allow the necessary frequency offset detection and compensation, and detection of a beginning of a frame in the receiving apparatus, so that the overall overhead is reduced. However, it is also possible to provide dedicated preambles for training patterns with pilot signals which precede the signalling patterns, which in this case do not need to (but may) comprise pilot signals. Since the one or more data patterns in each frame are according to the present invention equal to or a multiple of a minimum data pattern length, less signalling overhead is necessary to signal the length of the respective data patterns to a receiving apparatus, thus reducing the overhead. The present invention is particularly advantageous in systems having a rather high signal-to-noise ratio, such as but not limited to cable based systems. Although the receiver can be flexibly tuned to any wanted part of the transmission bandwidth, it is always possible to receive the signalling data and the other data (content data) due to the new frame structures suggested by the present invention. Further, the new frame structure enables a fast tuning of the receiving apparatus to the wanted part of the transmission bandwidth.

Advantageously each frame comprises at least one signalling pattern having signalling data. Advantageously, said signalling data comprise the length of each of said one or more data patterns in reference to said minimum data pattern length. Advantageously, said receiving apparatus further comprises evaluation means adapted to extract said length from received signalling data.

Advantageously, the number of scattered pilot signals in each data pattern is directly proportional to the number of minimum data pattern lengths in the respective data pattern. Advantageously, the channel estimation means is adapted to perform a channel estimation on the basis of said pilot signals. Thus, since a specific and fixed number of pilot signals is allocated to and comprised in the minimum data pattern length, for example one pilot signal, two pilot signals, three pilot signals or any suitable number of pilot signals, each data pattern comprises a resulting number of scattered pilot signals. The term scattered pilot signals in the present description refers to pilot signals which are arranged in the data patterns among the content data in a regular or irregular pattern in the time-frequency grid. This term does not include continual pilot signals, i.e. does not include pilot signals which are arranged immediately adjacent to each other in the frequency and/or time direction, although such continual pilot signals could be additionally present in the data patterns. In case that continual pilot signals are present, some of the continual pilot signals could in some implementations overlap or coincide with some of the scattered pilot signals. In other words, some of the scattered pilot signals could be formed by some of the continual pilot signals. All explanations and definitions of pilot signals comprised in data patterns in this specification are made in reference to such scattered pilot signals exclusively.

Further advantageously, the pilot signals are arranged in the one or more data patterns with a pilot signal pattern, wherein said minimum data pattern length depends on the density of said pilot signals in the pilot pattern. Hereby, the term pilot signal pattern is intended to characterize a certain structure and arrangement of pilot signals in the time/frequency grid of a frame (in the frequency domain), whereby the entire pilot signal pattern or at least some parts of it comprise pilot signals arranged in a regular pattern in the time and/or the frequency direction. Advantageously, the minimum data pattern length depends on the density of the scattered pilot signals in the pilot pattern. Hereby, the lower the pilot signal density is, the larger the minimum data pattern length can be and vice versa. Therefore, in a system, in which less pilot signals (a lower density of pilot signals) are necessary in order to achieve a reliable channel estimation on the receiver side, the minimum data pattern length can be larger as compared to systems in which a higher pilot signal density is needed. Advantageously, the pilot signals in the pilot signal pattern have a regular spacing in the frequency direction, whereby the minimum data pattern length corresponds to the spacing between two adjacent scattered pilot signals in a frequency direction (after a time interpolation). Hereby, it is ensured that the minimum data pattern length only comprises a single scattered pilot signal. Of course, it is also possible that the minimum data pattern length could be chosen so that two or more scattered pilot signals are comprised in each data pattern. Further advantageously, each data pattern has the same length in the time direction. While the data pattern length could (but not necessarily must be) variable in the time direction, this advantageous option suggests to provide each data pattern with the same length in the time direction (also called time domain). Hereby, the length of the data patterns in the time direction may advantageously correspond to the spacing between two adjacent scattered pilot signals in the time direction.

Further advantageously a time de-interleaving means is provided which is adapted to perform a block wise time de-interleaving on received data patterns with a block length corresponding to a multiple of the data pattern length in the time direction As explained above, under one option of the present invention, the frame structure of the present invention may comprise signalling patterns having pilot signals. Hereby, advantageously, the frame structure comprises at least two signalling patterns adjacent to each other in the frequency direction and at least one data pattern, whereby signalling data and pilots are arranged in said at least two signalling patterns in the frame, each signalling pattern having the same length. Advantageously, said pilot signals of said at least two signalling patterns in a frame form a pilot signal sequence. In other words, all pilot signals of a frame form a pilot signal sequence. Alternatively, said pilot signals in each one of said at least two signalling patterns advantageously form a pilot signal sequence, wherein the pilot signal sequences are different from each other. Advantageously, said pilot signals are modulated with a pseudo random binary sequence. Advantageously, said frame forming means is adapted to arrange said pilot signals in said at least two signalling patterns with a differential modulation scheme. Advantageously, said frame forming means is adapted to arrange said pilot signals so that a pilot signal is mapped onto every m-th frequency carrier of said at least two signalling patterns by the transforming means, m being an integer>1.

Advantageously, each of said at least two signalling patterns comprises at least one pilot band comprising said pilot signals.

Further advantageously, each frame comprises at least one additional data pattern succeeding said one or more data patterns in the time dimension (i.e. direction), each of said additional data patterns having the respective same length as the corresponding one of said previous data patterns. In other words, the structure of the data pattern(s) in each frame is advantageously set up in a way that the one or more data patterns are arranged in the frequency dimension so that the entire transmission bandwidth is covered. At least one additional data pattern is then arranged in the same frame but following the at least one data pattern in the time direction, whereby each additional or following data pattern has the same length (in the frequency dimension or direction) as the previous data pattern in the same frequency position. Thus, if a receiving apparatus is tuned to a specific part of the transmission bandwidth, at least one data pattern per frame is received, each of said data patterns having the same length but following each other in the time dimension. Hereby, the length of each of the data patterns in the transmitting apparatus could be adjusted dynamically. Alternatively or additionally, the number of additional data patterns in the time dimension could be adjusted dynamically. Also, the length of the data patterns in one frame in the time direction, i.e. the length of the time slots could be fixed or could be varying. Hereby it is important that the signalling patterns of the next frame all start at the same time point. Any dynamic changes in respect to the data patterns will then be signalled in the signalling patterns. The multi-carrier system with the frame structure as suggested by the present invention thus enables a very flexible transmission of data content in which the length of data patterns, and thus the amount of data per data pattern can be dynamically changed, for example from frame to frame or in any other required way. Alternatively, the length and/or the number of the data patterns may be fixed or permanent.

It has to be understood that the present invention can be applied to any kind of multi-carrier system in which a transmitting apparatus is adapted to transmit data in an entire transmission bandwidth and a receiving apparatus is adapted to selectively receive only a part of said entire transmission bandwidth. Non limiting examples for such systems may be existing or future uni-directional or bi-directional broadcast systems, such as wired or wireless (for example cable based, terrestrial etc.) digital video broadcast systems. The non limiting example for a multi-carrier system would be an orthogonal frequency division multiplex (OFDM) system, however, any other suitable system could be used in which data, pilot signals and the like are mapped on a plurality of frequency carriers. The frequency carriers may hereby be equidistant and respectively have the same length (bandwidth). However, the present invention may also be used in multi-carrier systems in which the frequency carriers are not equidistant and/or do not have the respectively same length. Further, it should be understood that the present invention is not limited to any kind of specific frequency range neither in the overall transmission bandwidth applied on the transmitting side nor on the selected part of the transmission bandwidth to which the receiving side is tuned. However, in some applications it might be advantageous to use a receiving bandwidth on the receiving side, i.e. a bandwidth for the part of the transmission bandwidth to which the receiver can be tuned, which corresponds to the bandwidth of receiving devices of existing (digital video broadcast or other) systems. A non limiting example for a receiver bandwidth may be 7.61 MHz, 8 MHz or any other suitable value, i.e. the receiving side can be tuned to any wanted 7.61 MHz, or 8 MHz etc. bandwidth from the overall transmission bandwidth. Hereby, the overall transmission bandwidth could be a multiple of 7.61 MHz, for example 7.61 MHz, 15.22 MHz, 22.83 MHz, 30.44 MHz, 60.88 MHz, 243.52 MHz etc, so that the segmentation of the overall transmission bandwidth, i.e. length of each signalling pattern could be 7.61 MHz. However, other numbers, segmentations and multiples are possible, e.g. (but not limited to) a length of each signalling pattern of 4 MHz, 6 MHz, 8 MHz or any other suitable value.

Generally, in case of the non limiting example of 8 MHz for the receiver bandwidth, the length of each of the signalling patterns used in the frame structure of the present invention could be 7.61 MHz, 6 MHz, 4 MHz (or less).

Figure 2:
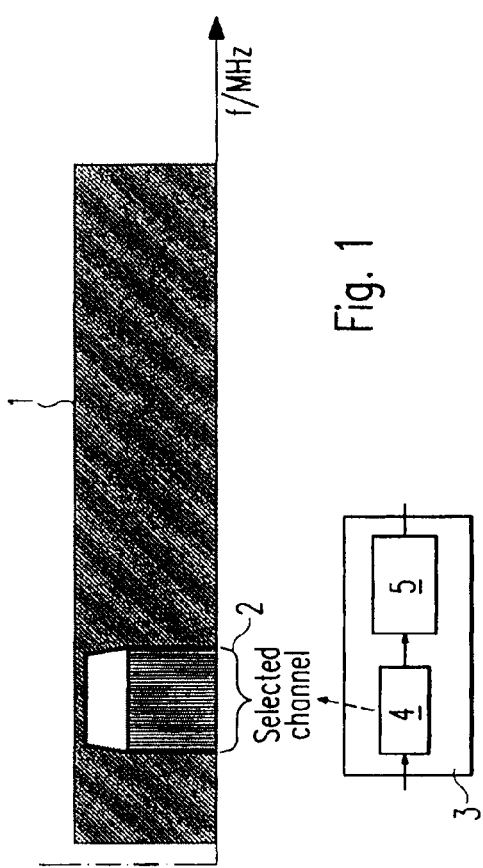
Figure 3:
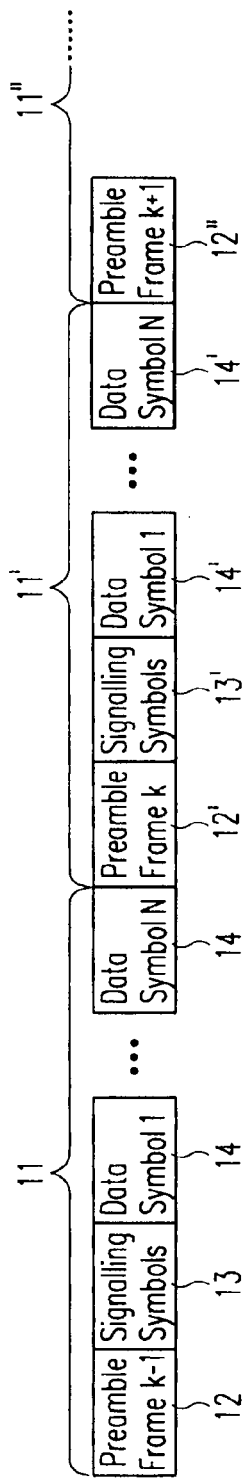
Figure 4:
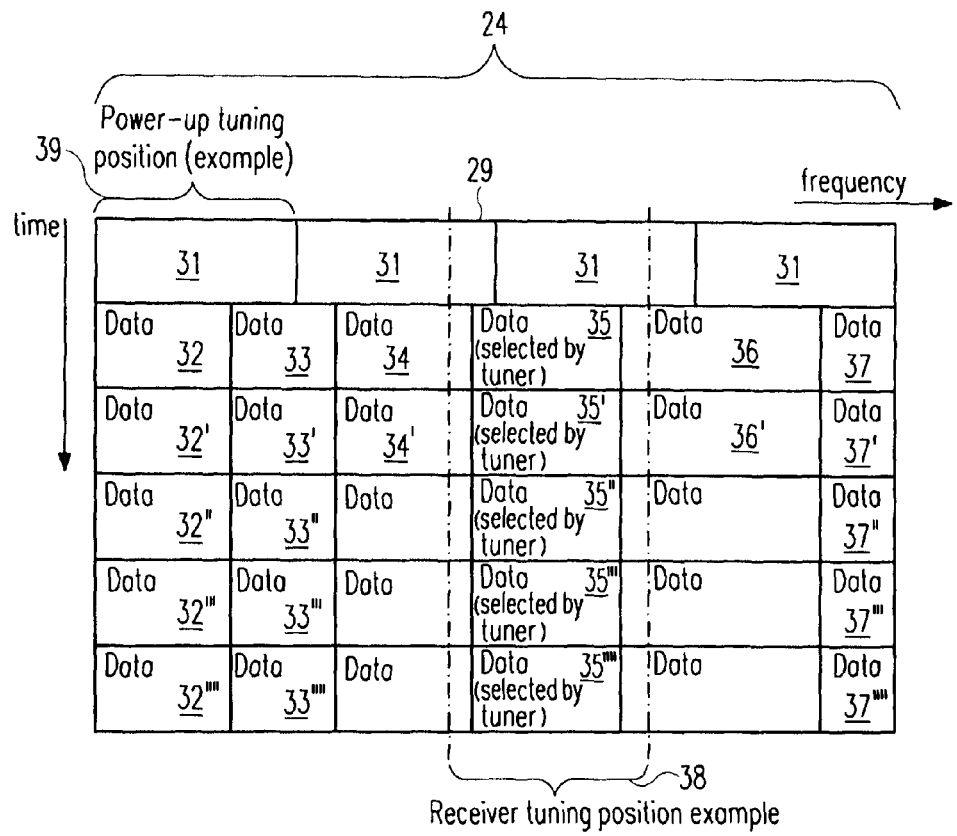
Figure 5:
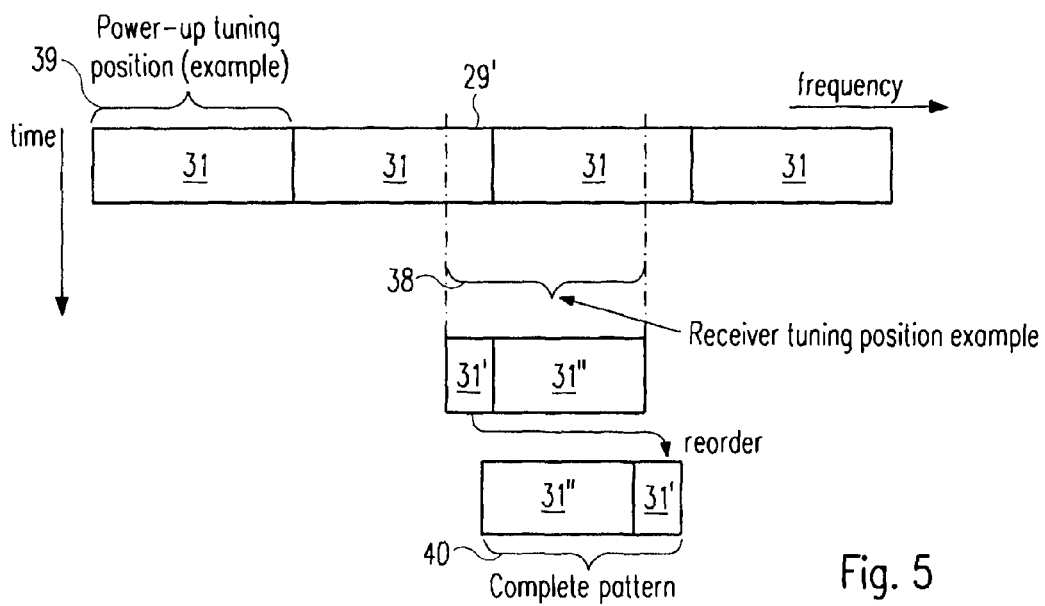
Figure 6:
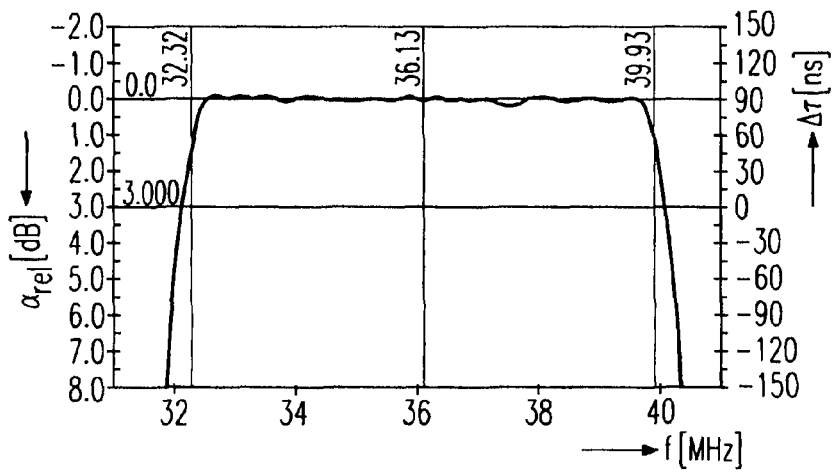
Figure 7:
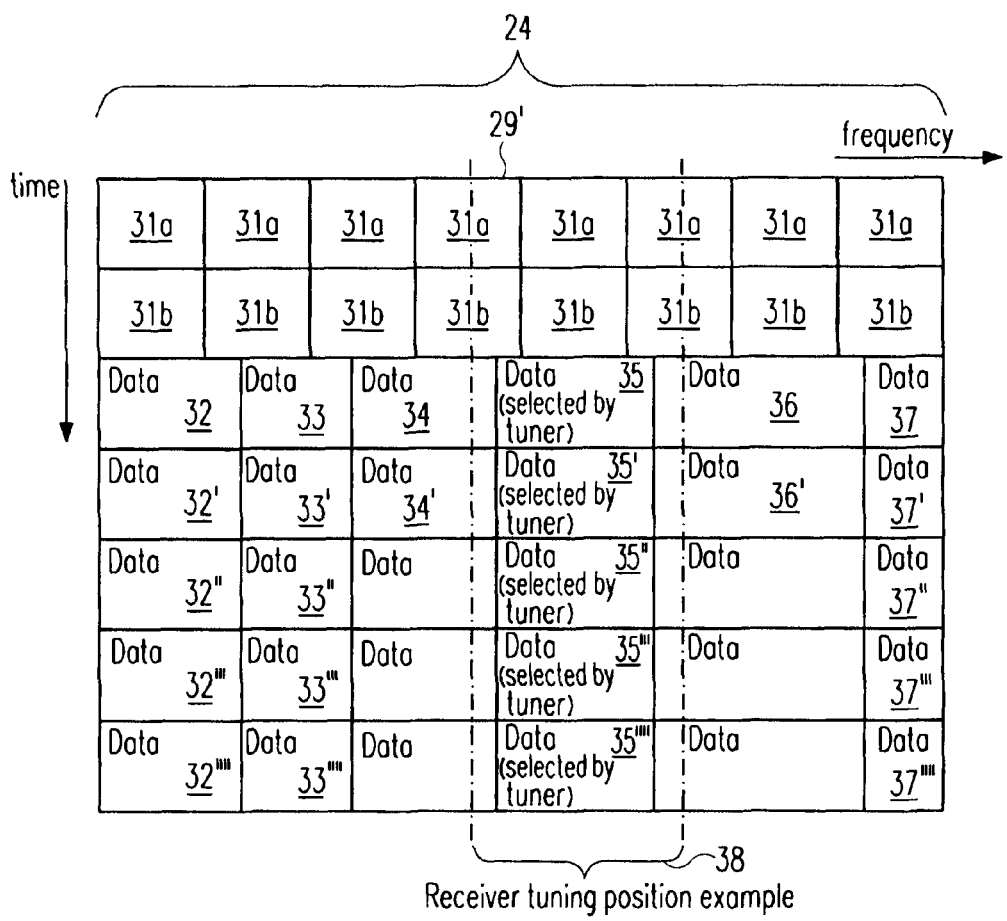
Figure 8:
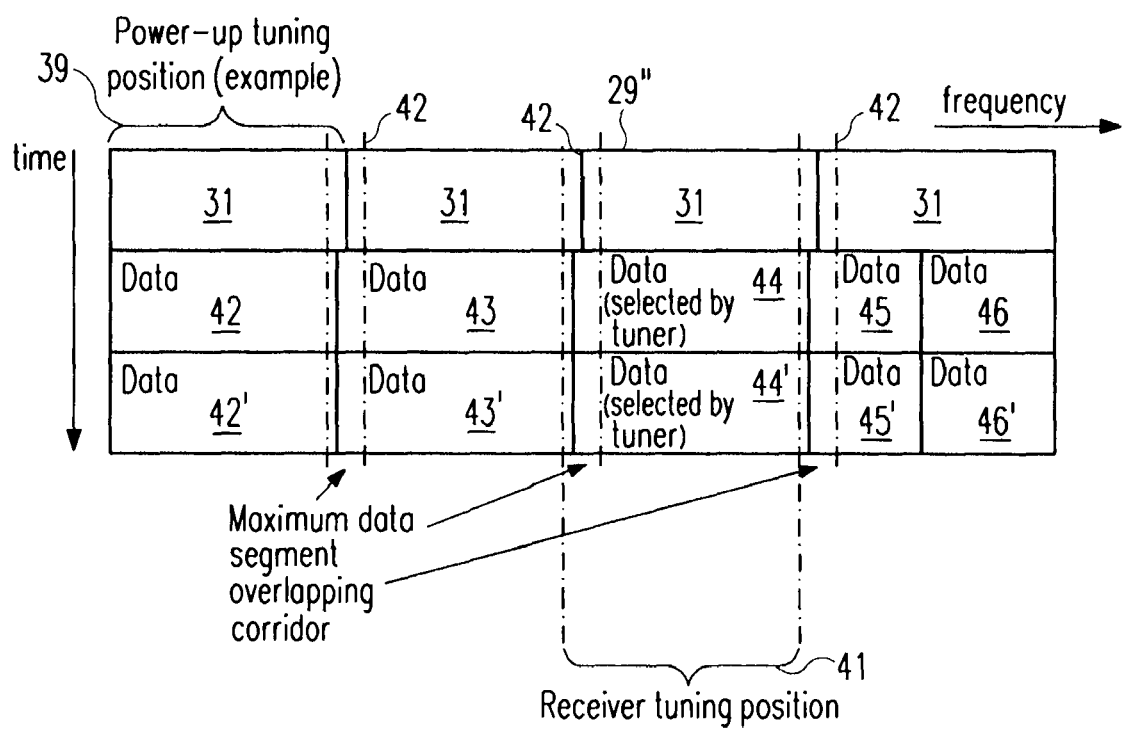
Figure 9:
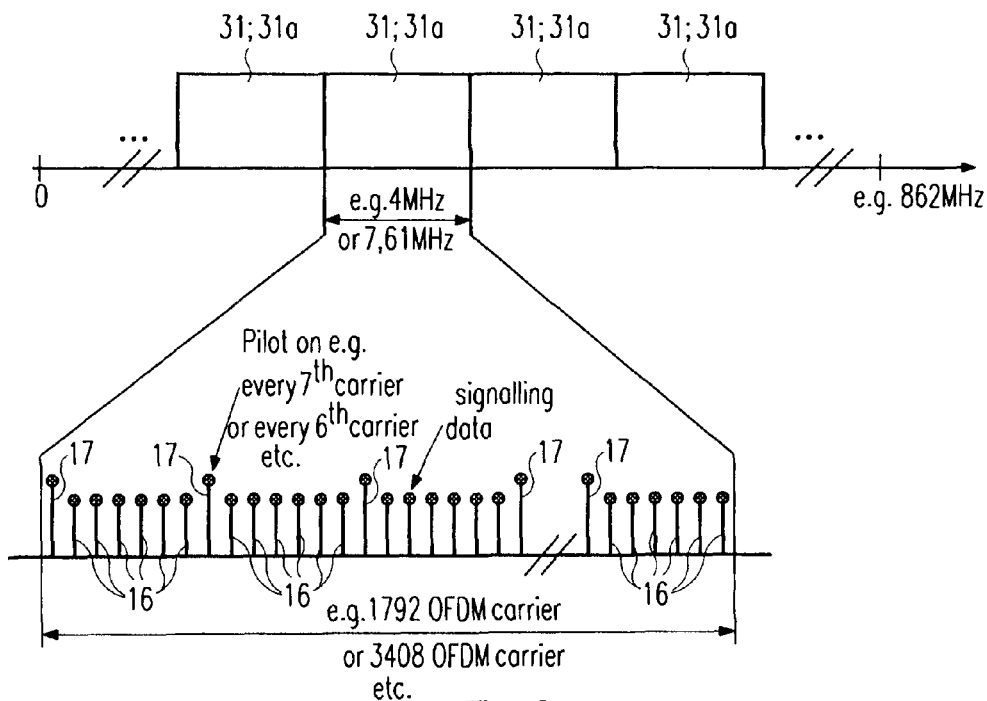
Figure 10:
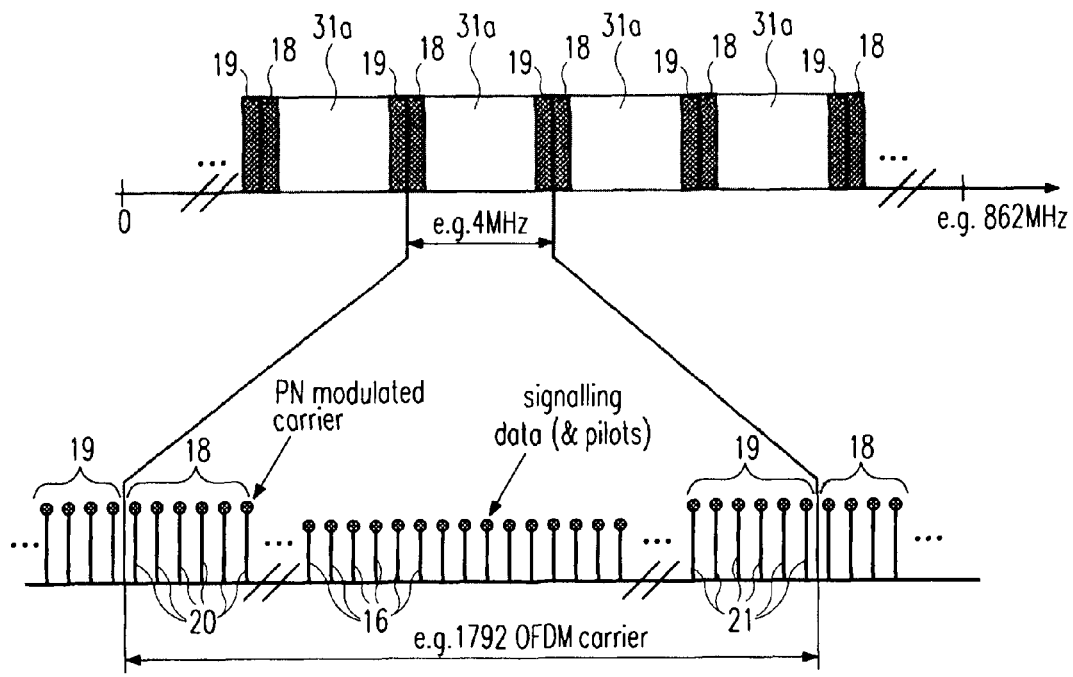
Figure 11:
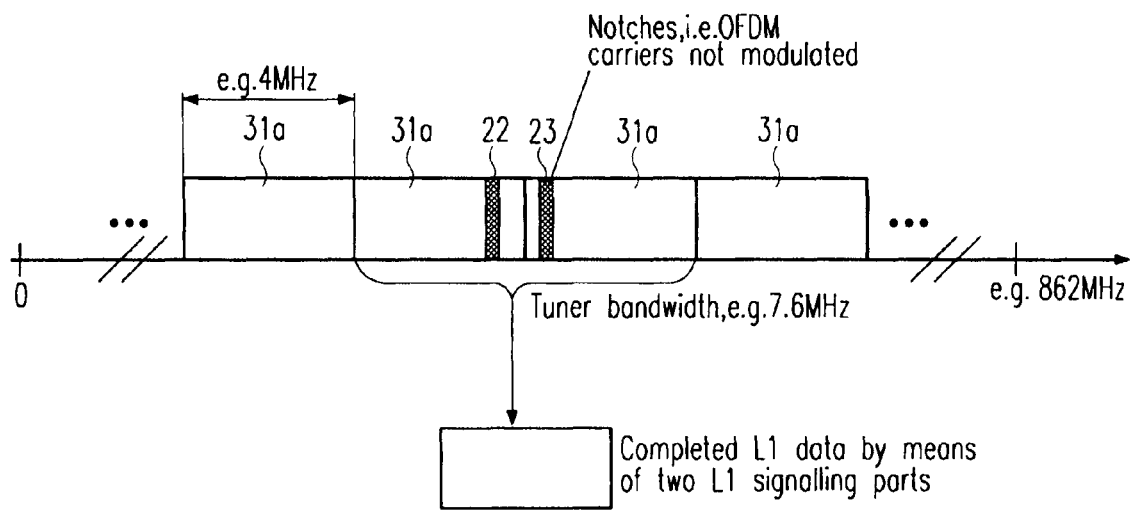
Figure 12:
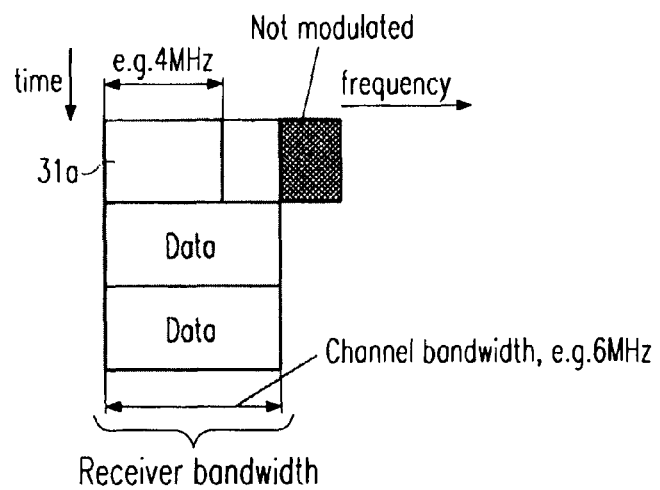
Figure 13:
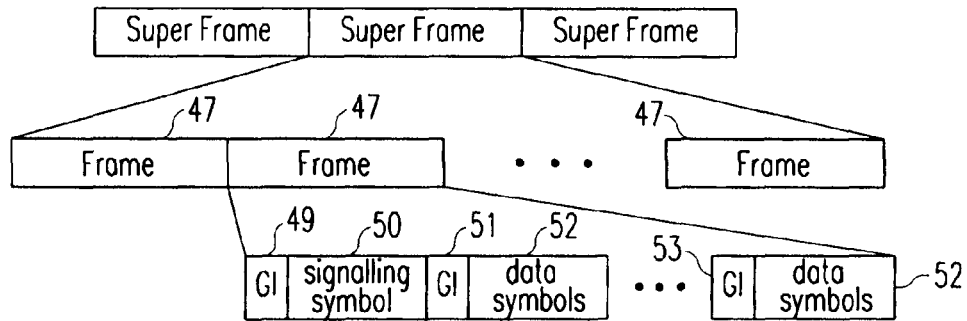
Figure 14:
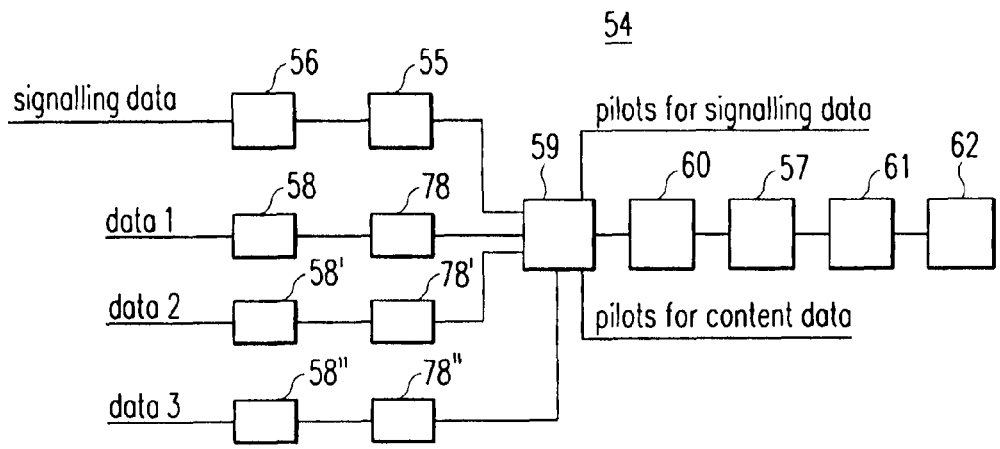
Figure 15:
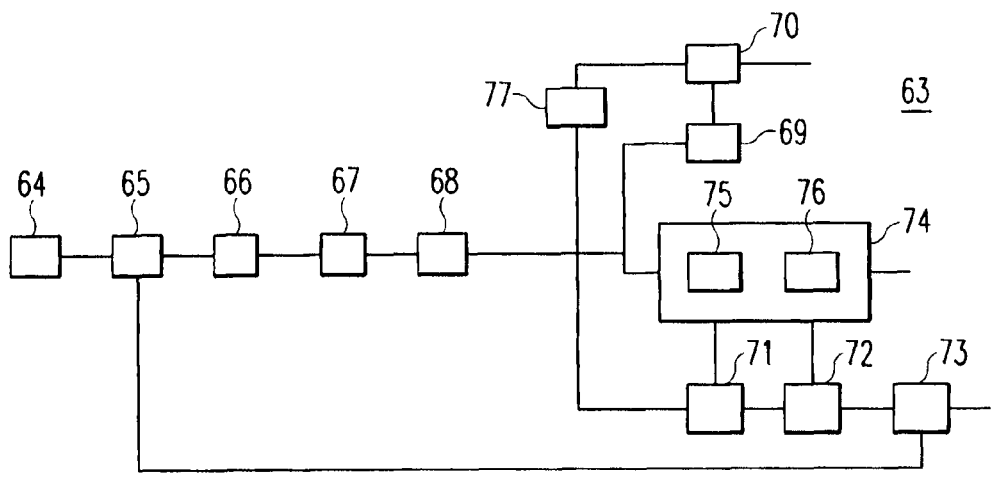
Figure 16:
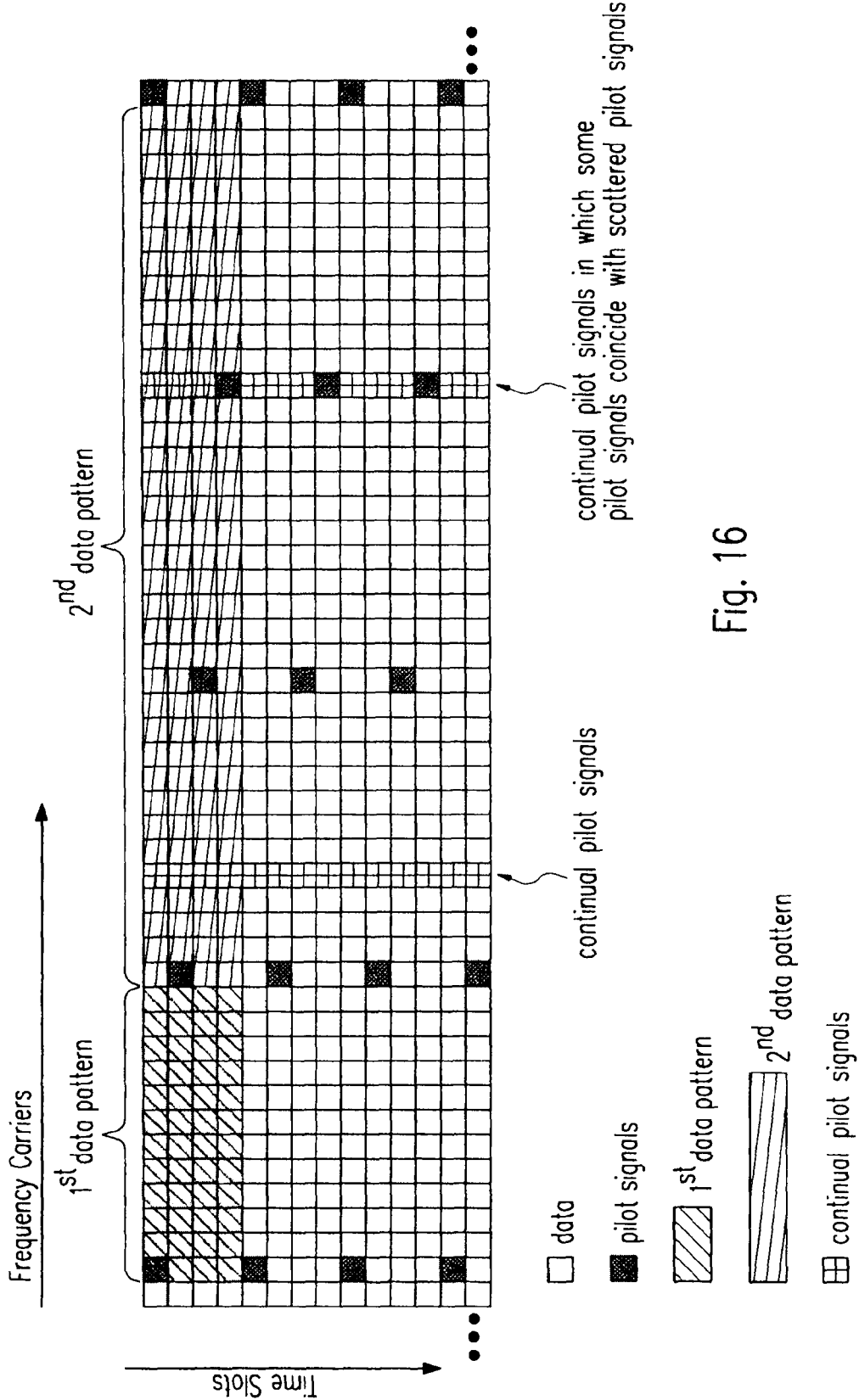

The present invention is explained in more detail in the following description of preferred embodiments in relation to the enclosed drawings, in which FIG. 1 shows a schematic diagram of an entire transmission bandwidth from which a selected part can be selectively and flexibly received by a receiver, FIG. 2 shows an example for a segmentation of the overall transmission bandwidth, FIG. 3 shows a schematic time domain representation of a frame structure according to the present invention, FIG. 4 shows a schematic example of a frame structure or pattern according to the present invention, FIG. 5 shows a part of the frame structure of FIG. 4 with an explanation of a reconstruction of a signalling pattern, FIG. 6 shows a schematic example of a receiver filter characteristic, FIG. 7 shows a further example of a frame structure of pattern according to the present invention, FIG. 8 shows a part of a further example of a frame structure or pattern according to the present invention, FIG. 9 shows a first example of an allocation of pilot signals to a signalling pattern, FIG. 10 shows a second example of an allocation of pilot signals to a signalling pattern, FIG. 11 shows a further example of a reconstruction of a signalling pattern, FIG. 12 shows an example of the adaptation to different channel bandwidths, FIG. 13 schematically shows an example of a frame structure of the present invention in the time dimension, FIG. 14 shows a schematic block diagram of an example of a transmitting apparatus according to the present invention, FIG. 15 shows a schematic block diagram of an example of a receiving apparatus according to the present invention, and FIG. 16 shows a schematic representation of a part of a frame structure according to the present invention.

FIG. 1 shows a schematic representation of an entire transmission bandwidth 1, in which a transmitting apparatus according to the present invention, as for example the transmitting apparatus 54 schematically shown in FIG. 14, transmits signals in a multi-carrier system in line with the present invention. In a cable television environment, the entire transmission bandwidth 1 could e.g. refer to a bandwidth in which digital television signals are transmitted to one or more recipients and could e.g. have a bandwidth of 64 MHz or any other suitable bandwidth. The transmission bandwidth 1 could hereby be part of a larger medium bandwidth within which different kinds of signals are transmitted via the respective wireless or wired transmission medium. In the example of cable television, the medium bandwidth could e.g. extend from (almost) 0 MHz to 862 MHz (or even higher) and the transmission bandwidth 1 could be a part of it. FIG. 1 further schematically shows a block diagram of a receiving apparatus 3 of the present invention, which is adapted to be tuned to and selectively receive a selected part 2 of the transmission bandwidth 1. Hereby, the receiving apparatus 3 comprises a tuner 4 which is adapted to be tuned to and selectively receive the wanted part 2 of the transmission bandwidth 1 as well as further processing means 5 which perform the further necessary processing of the received signals in line with the respective communication system, such as a demodulation, channel decoding and the like. A more elaborate example of a receiving apparatus according to the present invention is shown in the schematic block diagram of FIG. 15, which shows a receiving apparatus 63 comprising a receiving interface 64, which can for example be an antenna, an antenna pattern, a wired or cable-based receiving interface or any other suitable interface adapted to receive signals in the respective transmission system or communication system. The receiving interface 64 of the receiving apparatus 63 is connected to a receiving means 65 which comprises a tuning means, such as the tuning means 4 shown in FIG. 1 as well as further necessary processing elements depending on the respective transmission or communication system, such as down conversion means adapted to down convert the received signal to an intermediate frequency or the base band.

As stated above, the present invention enables a flexible and changing reception of a wanted part 2 of the transmission bandwidth 1 in a receiver by providing a specific and new frame structure for a multi-carrier system. FIG. 2 shows a schematic representation of an overall transmission bandwidth 1 (e.g. 32 MHz, 64 MHz or any other suitable number), within which a transmitting apparatus 54 of the present invention is adapted to transmit data content, such as video data, audio data or any other kind of data, in different segments or parts 6, 7, 8, 9 and 10. For example, the parts 6, 7, 8, 9 and 10 could be used by the transmitting apparatus 54 to transmit different kinds of data, data from different sources, data intended for different recipients and so forth. The parts 6 and 9 have for example a maximum bandwidth, i.e. the maximum bandwidth which can be received by a corresponding receiving apparatus 63 (e.g. 8 MHz or 7.61 MHz or any other suitable value). The parts 7, 8 and 10 have smaller bandwidths. It is now suggested to apply a frame structure or pattern to the entire transmission bandwidth 1 whereby each frame comprises at least two signalling patterns adjacent to each other in the frequency direction and a number of data patterns. Each signalling pattern has the same length and comprises signalling data as well as pilot signal mapped onto its frequency carriers (frequency subcarriers in the case of an OFDM system). In other words, the overall transmission bandwidth 1 is divided into equal parts for the signalling patterns, whereby the maximum bandwidth to which a receiver can be tuned, for example the bandwidth shown for parts 6 and 9 in FIG. 2, has to be equal or larger than the length of each signalling pattern. The new frame structure may therefore only comprise signalling patterns and data patterns, but not any separate training patterns or other patterns in which pilot signals are comprised. In other words, the present invention suggests a new frame structure with a preamble which only consists of two or more signalling patterns, and with data patterns following the preamble in the time direction. Alternatively, the signalling patterns could not have pilot signals, but could be preceded by training patterns with pilot signals.

It should be noted that the length of the various data parts in the transmission bandwidth cannot exceed the length (number of frequency carriers) of the maximum bandwidth to which a receiver can be tuned as will be explained in more detail further below.

FIG. 3 shows a schematic representation of an example of a time domain structure of frames 11, 12 according to the present invention. Each frame 11, 12 comprises one or more signalling symbols 13, 13' and several data symbols 14, 14'. Hereby, in the time domain, the signalling symbols are preceding the data symbols. Each frame 11, 12 may have a plurality of data symbols, wherein systems are possible in which the number of data symbols in each frame 11, 12 varies. The pilots signals comprised in the signalling symbols are used in a receiving apparatus 63 to perform channel estimation and/or integer frequency offset calculation as well as detection of the beginning of a frame (the beginning of a frame in the time as well as in the frequency domain can be detected). The time synchronization can e.g. be done by performing a guard interval correlation (or any other suitable technique) on guard intervals of received signalling symbols and/or data symbols in the time domain. The signalling symbols 13, 13' further contain signalling information, for example all physical layer information that is needed by the receiving apparatus 63 to decode the received signals, such as but not limited to L1 signalling data. The signalling data may for example comprise the allocation of data content to the various data patterns, i.e. for example which services, data streams, modulation, error correction settings etc. are located on which frequency carriers, so that the receiving apparatus 63 can obtain information to which part of the entire transmission bandwidth it shall be tuned. It is possible that all signalling patterns in a frame contain the identical signalling data. Alternatively, each signalling patterns may contain signalling data indicating the offset or distance of the respective signalling pattern from the beginning of a frame so that the receiving apparatus 63 may optimize the tuning to the wanted part of the transmission frequency in a way that the receipt of the signalling patterns and the data patterns is optimized. On the other hand, the offset or distance of the respective signalling pattern from the beginning of a frame can also be encoded in pilot signals, in pilot signal sequences or in guard bands allocated to or comprised in the signalling patterns, so that every signalling pattern in one frame can have the identical signalling data. The use of the frame structure according to the present invention has the further advantage that by dividing the data stream into logical blocks, changes of the frame structure can be signalled from frame to frame, whereby a preceding frame signals the changed frame structure of the or one of the succeeding frames. For example, the frame structure allows a seamless change of modulation parameters without creating errors.

FIG. 4 shows a schematic example of a frequency domain representation of a frame structure or pattern 29 according to the present invention. The frame structure 29 covers the entire transmission bandwidth 24 in the frequency direction and comprises at least one (or at least two, or at least three, etc.) signalling patterns 31 adjacent to each other in the frequency direction, each carrying the identical or almost identical signalling data mapped on respective frequency carriers and having the same length. In the example shown in FIG. 4, the first time slot of the entire transmission bandwidth 24 is sub-divided into four signalling patterns 31, but any other higher or lower number of signalling patterns might be suitable. In the transmitting apparatus 54 of the present invention as shown in FIG. 14, a frame forming means 59 is adapted to arrange the signalling data (obtained from a modulating means 55) as well pilot signals (supplied from a suitable means within the transmitting apparatus 54) in each signalling pattern. The signalling data are beforehand modulated by the modulating means 55 with a suitable modulation scheme, such as a QAM modulation or any other. Advantageously, a pseudo noise sequence, CAZAC sequence, PRBS or the like is used for the pilot signals, but any other pilot signal sequence with good pseudo noise and/or correlation properties might be suitable. Each signalling pattern of a frame might comprise a different pilot signal sequence, but alternatively, the pilot signals of the signalling pattern of one frame might form a single pilot signal sequence. It should be understood that the frame forming means 59 can be implemented as a single module, unit or the like, or can be implemented as or in several modules, units, devices and so forth. Further, it should be understood that the frame forming means 59 may not form an entire frame structure or pattern 29 as shown in FIG. 4 (or frame structure or pattern 29' as shown in FIG. 7) at one time point, but may be adapted to form one part of the frame structure 29 (or 29') after another in the time dimension, i.e. time slot after time slot. For example, the frame forming means 59 could be adapted to first arrange the signalling patterns 31 as shown in FIG. 4 adjacent to each other as well as to add the pilot signals as described above and below over the entire width of the transmission bandwidth 24, i.e. in the example shown in FIG. 4: four signalling patterns 31. Then, this part of the frame 24 (the first time slot) could be further processed, for example by transforming it from the frequency domain into the time domain in a frequency to time transformation means 60, by building a resulting time domain symbol (for example an OFDM symbol) and so forth. Then, in the next step, the frame forming means 59 could be adapted to process the line or sequence of data patterns 32, 33, 34, 35, 36, 37, i.e. the next time slot, in the manner which will be described further below, over the entire transmission bandwidth 24, where after these data patterns are further processed for example by transforming them from the frequency domain into the time domain, by forming a time domain symbol (for example an OFDM symbol) and so forth. Thus, in the representation of FIG. 4, the frame structure 29 could be formed by the frame forming means 59 line wise or time slot wise. Each part of the frame structure 29 which extends over the entire transmission bandwidth 24 in the frequency direction will be formed and processed as one block but the parts succeeding each other in the time direction (time slots) will be formed and processed one after the other.

The frame forming means 59 might be adapted to arrange said pilot signals so that a pilot signal is mapped onto every m-th frequency carrier 17 (m being a natural number larger than 1) in each signalling pattern, so that the frequency carriers 16 in between the pilots carry the signalling data, as will be explained in more detail in relation to FIG. 9 below. Additionally or alternatively, the frame forming means 59 may be adapted to arrange said pilot signals so that pilot signals are mapped onto frequency carriers 20, 21 of at least one pilot band 18, 19 comprised in a signalling pattern, as will be explained in more detail in relation to FIG. 10 below. A pilot band 18, 19 consists of a number of immediately adjacent frequency carriers, onto which pilot signals are mapped. Hereby, each signalling pattern may have a single pilot band 18 or may have two pilot bands 18, 19, one at the beginning and one at the end of the signalling pattern in the frequency direction. The length of the pilot bands (number of frequency carriers allocated to a pilot band) is advantageously the same for each signalling pattern. The length or bandwidth 39 of every signalling pattern 30 may be the same as the bandwidth 38 to which the tuner of the receiving apparatus 63 can be tuned. However, the part of the transmission bandwidth to which the tuner of the receiving apparatus 63 can be tuned, may be larger than the length of a signalling pattern 30. The mapping of the signalling data and pilot signals onto frequency carriers is performed by the frequency to time transformation means 60 during the transformation from the frequency to the time domain. All statements made above (and below) in relation to the pilot signals comprised in the signalling patterns could also apply to the pilot signals comprised in the data patterns as explained e.g. in relation to FIG. 16.

The received pilots, i.e. pilot signals mapped on every m-th frequency carrier and/or comprised in pilot bands of a received signalling pattern, (after transformation into the frequency domain in the time to frequency transformation means 68) are used for a channel estimation of the frequency carriers in the frame in a channel estimation means 69, which provides a de-mapping means 70 with the necessary channel estimation information enabling a correct de-modulation of the content data from the frequency carriers in the received data patterns. Also, the received pilots are used in the receiving apparatus 63 for an integer frequency offset detection in a corresponding integer frequency offset detection means 67 which enables a detection and then a compensation of the integer frequency offset of the received signals. The integer frequency offset is the deviation from the original (transmitted) frequency in multiples of the frequency carrier spacing.

The received pilots are further used for a detection of the beginning of a frame 29, 29' (frame beginning in the time and in the frequency domain).

Each signalling pattern 31 comprises for example the location of the signalling pattern 31 within the frame. For example each signalling pattern 31 in each frame 29, 29' has and carries the identical signalling data, except the location of the respective signalling pattern in the frame, which is different in each signalling pattern 31 in a frame. The signalling data are for example L1 signalling data which contain all physical layer information that is needed by the receiving apparatus 63 to decode received signals. However, any other suitable signalling data may be comprised in the signalling patterns 31. The signalling patterns 31 might for example comprise the location of the respective data segments 32, 33, 34, 35, 36 so that a receiving apparatus 63 knows where the wanted data segments are located so that the tuner of the receiving apparatus 63 can tune to the respective location in order to receive the wanted data segments. Alternatively, as stated above, each signalling pattern of a frame might comprise the identical signalling data, and the location of the respective signalling pattern within a frame is signalled in a different way, e.g. by means of the pilot signal sequence of the signalling patterns or by means of information encoded in guard bands or the like. As stated above, each of the signalling patterns 31 could comprise information about each of the data patterns comprised in a frame. This information could include the data pattern length, the number and/or the location of the pilot signals comprised in the data patterns and/or the tuning position (e.g. center of the tuning bandwidth, start of the tuning bandwidth or the like) and/or any other suitable information. Hereby, the information on the length of the data patterns is e.g. expressed in terms of or referring to the minimum data pattern lengths. However, in order to reduce the overhead, each signalling pattern 31 could comprise information about only a part or some of the data patterns, for example but not limited to the ones which are located within (or located within and adjacent to) the frequency band in which the signalling pattern 31 is located. In the example of FIG. 4, the first signalling pattern 31 in the frame could comprise information about the data patterns 32 and 33 (and the time wise following data patterns 32', 32" . . . 33', 33" etc). The second signalling pattern in the frame could comprise information about the data patterns 33, 34 and 35 (and the time wise following data patterns 33', 33" . . . 34', 34" . . . 35', 35" etc).

As mentioned above, the first signalling patterns 31 could also comprise the tuning position, i.e. the frequency band to which a receiver such as the receiving apparatus 63 shall be tuned in order to receive the corresponding data patterns. This tuning position could for example be signalled as the center of the tuning bandwidth, the start of the tuning bandwidth or any other suitable frequency position. This has the advantage that the length (in the frequency direction) of the data patterns could be varied from frame to frame within the current tuning bandwidth without the need or necessity to tune the receiving apparatus 63 from frame to frame. In other words by signalling the tuning position in the first signalling patterns 31, a receiving apparatus could easily cope with data patterns of a various lengths within the current tuning bandwidth. Further, such an implementation would have the advantage that it would not be necessary to provide guard bands (in the frequency domain) between adjacent transmission channel bandwidths. Each transmission channel bandwidth (each transmission channel bandwidth for example is an integer multiple of the tuning bandwidth) comprises signalling patterns, wherein each of the signalling patterns for example has the identical (or almost identical) signalling data. The signalling data in first signalling patterns 31 of neighbouring transmission channel bandwidths, however, could be different. Hereby, by having information on the beginning of the tuning bandwidth for each respective receiver comprised in the signalling data of the first signalling patterns 31a clear and unambiguous allocation of the first signalling data to a respective receiver could be achieved and therefore the guard bands between adjacent transmission channel bandwidths would not be necessary any longer. Further, by signalling the tuning position it can be avoided that a receiver is tuned to a position in which a part of a first kind of signalling patterns and a part of a second kind of signalling patterns are received within the tuning bandwidth, whereby the parts could not be re-ordered or re-combined since they contain different signalling content. A further possibility is to additionally include information in the signalling data of the first signalling patterns 31 if a notch is present in the following data pattern. In an advantageous embodiment, the notch always has the length of a minimum data pattern or an integer multiple thereof. In this case, a notch can always be treated as a data pattern from a logical point of view. Including information about the positions of notches in the signalling data has the further advantage that the receiver automatically knows that e.g. continual pilot signals are present at the borders of the notch in the neighbouring data patterns, by which the data capacity of these data patterns is reduced.

In addition to the dedicated signalling pattern 31 as explained above, the frame structure could also comprise additional signalling data embedded or comprised in the data patterns. For example, each column of data patterns, e.g. 33, 33', 33", 33'", 33"", could contain signalling data indicating the modulation used for time data patterns, their error coding and/or connection identification information enabling the receiving apparatus to determine if the data is intended to be received or not. This reduces the implementation complexity in the receiver as well as guarantees short delays for interactive services. This possibility applies to all embodiments of the present invention.

As shown in FIG. 15, the receiving apparatus 63, after the receiving means 65 with the tuner, comprises a time synchronization means 66 adapted to perform time synchronization and a fractional frequency offset detection means 67 adapted to perform fractional frequency offset detection and compensation on the received time domain symbols. The received time domain symbols are then supplied to a time to frequency transformation means 68 for transforming the received time domain signals into the frequency domain, where after the signalling data (after an optional reconstruction in a reconstruction means 71), are de-modulated in a de-mapping means 72 and then evaluated in an evaluation means 73. The evaluation means 73 is adapted to extract the necessary and required signalling information from the received signalling data. If necessary, additional signalling patterns could be provided in the time direction immediately succeeding the signalling patterns 31.

The frame structure or pattern 29 further comprises at least one data pattern or segment extending over the entire frequency bandwidth 24 in the frequency direction and following the signalling patterns 31 in the time direction. In the time slot immediately following the time slot in which the signalling patterns 31 are located, the frame structure 29 shown in FIG. 4 comprises several data segments 32, 33, 34, 35, 36 and 37 with different lengths, i.e. a different number of respective frequency carriers onto which data are mapped. The frame structure 29 further comprises additional data segments in succeeding time slots, whereby the additional data patterns respectively have the same length and number of frequency carriers as the respectively preceding data pattern. For example, the data pattern 32', 32", 32''' and 32'''' have the same length as the first data pattern 32. The data patterns 33', 33''', 33''' and 33'''' have the same length as the data segment 33. In other words, the additional data patterns have the same frequency dimension structure as the several data patterns 32, 33, 34, 35, 36 and 37 in the first time slot after the signalling patterns 31. Thus, if the receiving apparatus 63 for example tunes to a part 38 of the transmission bandwidth in order to receive the data pattern 35, all time wise succeeding data patterns 35', 35" and 35''' which have the same length as the data pattern 35 can be properly received.

As mentioned above, the frame forming means 59 may form the respective lines of data patterns extending over the entire transmission bandwidth 24 one after the other, i.e. time slot by time slot. For example, the data patterns 32, 33, 34, 35, 36, 37 will be formed by the frame forming means 59, then transformed from the frequency domain into the time domain. Afterwards, the data patterns 32', 33', 34', 35', 36', 37' will be formed by the frame forming means 59 and then transformed from the frequency domain into the time domain. Afterwards, the data patterns 32", 33", 34", 35", 36", 37" will be formed by the frame forming means 59 and then transformed from the frequency domain into the time domain and so forth. The transformation from the frequency to the time domain will be done by the frequency to time transformation means 60, in which the data are mapped onto frequency carriers during the transformation from the frequency domain to the time domain.

As mentioned earlier, the length of the one or more data patterns, e.g. the data patterns shown in the frame structures of FIG. 4 and FIG. 7, comprised in a frame structure according to the present invention each comprise at least one pilot signal, whereby the length of each of the one or more data patterns is equal to or a multiple of a minimum data pattern length. The minimum data pattern length can for example be set in a way that at least one pilot signal is comprised in each data pattern of a frame. Alternatively two, three, four, five or any other suitable number of pilot signals could be comprised in one minimum data pattern length. Hereby, in some implementations it might be advantageous to choose rather small data pattern lengths in order to have a higher flexibility in the allocation of the data patterns for the transmission of content data. Therefore, in some implementations it might be more advantageous to choose a minimum data pattern length so that only a single one or maybe two pilot signals are comprised in it. However, other implementations may be possible. Further, in some implementations it might be useful to set the minimum data pattern length depending on the density or number of pilot signals comprised in an entire frame. For example, in case that the pilot signals among the data patterns are chosen so that a good and reliable channel estimation on the receiving side is enabled without loosing too much transmission capacity (by allocating pilot signals to frequency carriers of data patterns instead of data). For example, in systems in which the occurrence of multipath effects or other negative effects necessitate the provision of a rather high number (and resulting density) of pilot signals, the result will normally be that the pilot signals are closer together (in frequency and/or in time direction), so that the minimum data pattern length could be rather short if only a single pilot signal would be comprised in it. On the other hand, in case of systems in which a lower number (and density) of pilot signals is required in order to enable a reliable channel estimation on a receiving side, the frequency and time direction spacing of the pilot signals could be comparatively large, so that the resulting minimum data pattern length could be longer. Normally, in the time domain, guard intervals are provided in between data symbols or the data symbols comprise guard intervals in order to cope with multipath effects or other negative effects. Thus, there can be a correlation between the length of the guard intervals between the data symbols and the density of the pilot signals in the data patterns of a frame. The longer the guard intervals are, the higher the number of the required pilot signals among the data patterns usually is and vice versa. Thus, the pilot signal density and number among the data patterns of a frame could be set depending on the guard interval length, so that the minimum data pattern length could depend on the length of the guard intervals. Hereby, the minimum data pattern length could be signalled in the signalling data independent from the guard interval length, e.g. as multiples of a basic length of e.g. 12 frequency carriers (similar in the time direction if the length in the time direction is not fixed). Hereby, the necessary signalling could be reduced since the minimum data pattern length would be signalled always in the same way independent from the specific system implementation (guard interval length etc.).

The provision of a minimum data pattern length which determines the length of each of the data patterns within a frame reduces the signalling overhead since the length of the data pattern has to be communicated only by reference to the minimum data pattern length from the transmitter to the receiver. On the other hand, the location of the data patterns within a frame is known to the receiver since entire transmission bandwidth is a multiple of the minimum data pattern length. Thus, the frequency alignment, i.e. the frequency location in the time/frequency grid in the frequency domain is always the same for the data patterns and therefore known to the receiver, such as the receiving apparatus 63 as shown and explained in relation to FIG. 15. Further, particularly in case when the pilot signals form a pilot signal pattern with a regular spacing between adjacent pilot signals in the frequency and the time direction, the location of the pilot signals in the time/frequency grid is also known to the receiving apparatus so that they do not need to be signalled either. FIG. 16 shows an example of a pilot signal pattern in a time/frequency grid. Specifically, FIG. 16 shows a part of an entire frequency bandwidth, for example a data part of the frame shown in FIG. 4 or in FIG. 7 with a detailed representation of the frequency carriers in the frequency direction (horizontal direction) and the time slots (vertical direction), each time slot resulting in a data symbol after frequency to time transformation. In the example shown in FIG. 16, the spacing of the pilot signals in the frequency direction is 12, i.e. every $12^{th}$ frequency carrier carries a pilot signal (all other frequency carriers carry data). However, as can be seen in FIG. 16, "adjacent" pilot signals are not adjacent in the same time slot, but in neighbouring or immediately adjacent time slots. This enables a better channel estimation in the receiving apparatus 63 and the time direction. Alternatively, adjacent pilot signals in the frequency direction could be allocated to the same time slot, or could be spaced by one, two or any other suitable number of time slots. In the time direction, adjacent pilot signals are, for example shown in FIG. 16, spaced by 4 time slots, i.e. every $4^{th}$ time slot carries a pilot signal. Hereby, adjacent pilot signals in the shown example are located in the same frequency carrier. Alternatively, adjacent pilot signals in the time direction could be spaced by 1, 2, 3 or any other suitable number of frequency carriers. Thus case that the minimum data pattern length is set to the spacing between adjacent pilot signals in the frequency direction as well as in the time direction, a single pilot signal would be comprised within the minimum data pattern length, which has 12 frequency carriers in the frequency direction and 4 time slots in the time direction. Thus, the minimum data pattern comprises 48 pilot signals (which correspond to a pilot density of 1/48). In FIG. 16, two examples of possible data patterns are indicated. The first data pattern has a length corresponding to the minimum data pattern length, i.e. comprises 48 frequency carriers, whereas the second data pattern comprises 3 minimum data pattern lengths or sizes, i.e. comprises 144 frequency carriers. Generally, the use of such a pilot pattern or similar pilot pattern ensures that the pilot locations within the data patterns are easier to predict in the receiving apparatus 63.

Hereby, the pilot signal could be scattered among the carriers with the data in a regular or an irregular pattern over all the data patterns in one time slot of a frame 29, 29', i.e. over the entire transmission bandwidth. In addition, each first and last frequency carrier of the entire transmission could always carry a pilot signal, so that continual pilots are present in the frequency carriers in the time direction. Also, additional continual pilots, i.e. immediately adjacent pilot signals in the time direction could be present in at least some of the data patterns in selected frequency carriers in the time direction. The definitions and explanations of the minimum data pattern length above and below only and exclusively make reference to scattered pilot signals, not continual pilot signals. Scattered pilot signals are hereby pilot signal which are arranged in a regular or irregular pattern in the time-frequency grid, wherein each pilot signals is isolated from the other, i.e. does not have immediately adjacent neighbours in the time and the frequency direction. It is to be noted that implementations might be possible in which some scattered pilot signal coincide with some continual pilot signals in the time frequency grid. In other words, continual pilot signals (continual in the time or frequency direction) could be present in time-frequency locations in which scattered pilot signals of a regular or irregular pattern would have been present. In FIG. 16, two examples of continual pilot signals comprising immediately adjacent pilot signals in the time direction are shown. The first continual pilot signals are located in the $4^{th}$ frequency carrier of the $2^{nd}$ data pattern. As can be seen in FIG. 16, each frequency carrier in immediately adjacent time slots carries a pilot signal so that a row or sequence of continual pilot signals is formed. The second row of continual pilot signals shown in the examples of FIG. 16 is located in the $25^{th}$ frequency carrier of the $2^{nd}$ data pattern and also comprises a pilot signal in each immediately adjacent time slot. However, in this second row or sequence of continual pilot signals, some of the pilot signals coincide with scattered pilot signals, i.e. some of the continual pilot signals are located in locations where scattered pilot signals of the regular pilot signal pattern would have been located. However, for the definitions of the minimum data pattern length in the present application, only scattered pilot signals including pilot signals which are part of the continual pilot signals but are in locations in which scattered pilot signals would have been located are to be considered and are relevant. The pilot signals in the data pattern could e.g. be formed by a pilot signal sequence, which could be any kind of suitable sequence with good correlation properties, e.g. a pseudo-noise sequence, a PRBS (pseudo-random binary sequence) or the like. The pilot signal sequence could e.g. be the same in each (frequency domain) frame, or one pilot signal could be used for the entire transmission bandwidth 1 or even the entire medium bandwidth (or at least parts of it). If a PRBS generator is used in the transmitting apparatus 54, a pilot would be generated for every frequency carrier but only the ones for the pilot signals would be used. In the case of a pilot sequence for the entire medium bandwidth, the PRBS generator would be initialized only once at the (virtual) frequency 0 MHz, so that the pilot signal sequence is unique. Alternatively, the pilot signal sequence could be repeated several times in the frequency domain but should be unambiguous in the respective transmission bandwidth (e.g. the pilot signal sequence could be repeated every 200 MHz or any other suitable number).

The receiving apparatus 63 shown in FIG. 15 comprises the channel estimation means 69 which is adapted to perform a channel estimation on the basis of the pilot signals received in data patterns and to provide a de-mapping means 70 with the necessary channel estimation information. The de-mapping means 70 is thus able to de-map the data from the frequency carriers correctly on the basis of the channel estimation information.

Further, if every data pattern has the same length in the time direction, this ensures a constant number of data symbols (in the time domain) independent from the tuning position of the receiving apparatus 63. In addition hereto, having the data pattern length being equal to or multiple of a minimum data pattern length, an easier and better predictable adjustment of time interleavers 78, 78', 78'' of the transmitting apparatus 54 and a time de-interleaver 77 comprised in the receiving apparatus 63 is achieved. The time interleavers 78, 78', 78'' are arranged after the modulating means 58, 58', 58'', respectively and are adapted to perform time interleaving on the data. The time de-interleaver 77 of the receiving apparatus 61 is located in front of the de-mapping means 70 (and after the time to frequency transformation means 68) and performs time de-interleaving correspondingly. Specifically, the time interleavers 78, 78', 78'' and the time de-interleaver 77 could advantageously be realized as block interleavers having a size which depends on the minimum data pattern length in the time direction. Advantageously, the block size is hereby a multiple of the minimum data pattern length, i.e. of the data patterns having the same length, in the time direction (e.g. a multiple of 4 for the example of FIG. 16).

The flexible and variable data pattern structure of the frame structure or pattern 29 as suggested by the present invention can for example be implemented in the transmitting apparatus 54 of the present invention as shown in FIG. 14 by mapping of various different data streams, for example with different kinds of data and/or data from different sources, as visualized by the branches data 1, data 2 and data 3 in FIG. 14. The content data of each branch are modulated according to the implemented modulation scheme, for example a QAM or any other suitable modulation, in a respective modulating means 58, 58', 58''. The respective content data are then arranged in data patterns in the frame forming means 59, for example by a data pattern forming means comprised in the frame forming means 59 or by any other suitably implemented module, means, unit or the like. As mentioned, the frame forming means 59 also forms the signalling patterns with the signalling data and the pilot signals, which are supplied to the frame forming means 59 by a suitable pilot generating module (not shown), for example by a signalling pattern forming means or any other suitable unit, module or element comprised in the frame forming means 59. The frame forming means 59 then forms the frames having the frame structures 29, 29' with the signalling patterns and the data patterns as described. As mentioned, the frame forming means 59 could be implemented in one or several modules, or could also be part of other processing units or modules. Further, the frame forming means 59 may be adapted to form a frame 29 part by part at succeeding time periods, for example by first forming the sequence of signalling patterns 31 in the first time slot and extending over the entire transmission bandwidth 24, then by forming the sequence of data patterns 32, 33, 34, 35, 36, 37 in the second time slot and extending over the entire transmission bandwidth 24 and so forth. The signalling data, the pilot signals and the content data are then separately in one of the another transformed from the frequency to the time domain and mapped onto frequency carriers by the frequency to time transforming means 60 (which is for example an inverse Fast Fourier transformation means or the like). Hereby, it is to be noted that the frame structure 29, 29' forms the basis for the frequency to time transformation. The signalling data including the pilot signals as well as the content data of each of the time slots (time units in the time dimension of the frame structures 29, 29') of the entire transmission bandwidth 24 are mapped onto the frequency carriers. In other words, all the patterns of the entire transmission bandwidth 24 in each time slot are always mapped onto the necessary number of frequency carriers. For example, the first time slot (i.e. all signalling patterns 31) of the frame structure 29 of FIG. 4 would then result in a signalling symbol, the second time slot (i.e. all data patterns 32, 33, 34, 35, 36, 37) of the frame structure would then result in a data symbol and so forth. The correspondingly formed time domain symbols (for example OFDM symbols) are then supplied from the frequency to time transforming means 60 to a guard interval adding 57 which adds guard intervals to the time domain symbols. The thus formed transmission symbols are then transmitted by transmitting means 61 via a transmitting interface 62, which is for example a suitable antenna, antenna pattern or the like.

As stated, at least some of the various data patterns may have different lengths, i.e. different numbers of frequency carriers in case that the frequency carriers are equidistant and have the same bandwidth, respectively. Alternatively, the number of data patterns in the frequency direction may be the same as the number of signalling patterns, wherein the length (or bandwidth) of each data patterns may be identical to the length of each signalling pattern and they may be aligned to each other (have the same frequency direction structure). Alternatively, each data pattern might have the same length and the number of the data patterns might be a multiple of the number of signalling patterns, while still having the same frequency structure and alignment. Thus for example, 2, 3, 4 or more data patterns would be aligned to each of the signalling patterns. Generally, the length of the data patterns in the frequency direction needs to be smaller or at maximum equal to the effective receiver bandwidth so that the data patterns can be received in the receiving apparatus 63. Further, the transmitting apparatus 54 may be adapted to change the data pattern structure, e.g. the length and/or the number of the data patterns (in frequency and/or time direction) dynamically. Alternatively, the structure of the data patterns could be fixed or permanent.

Generally (for all embodiments described herein), the transmitting apparatus 54 could be adapted to only generate and transmit signalling patterns if respective data patterns (following in the time direction) are to be transmitted. In other words, only signalling patterns at location where data are transmitted are generated. Hereby, signalling patterns extending over the data patterns (in frequency direction) could be cut off (not transmitted), if resorting in the receiver is possible and one complete signalling pattern can be obtained by resorting the received parts. Alternatively, signalling patterns could be transmitted even if no data patterns following in the time direction are to be transmitted. Any kind of combination of these two possibilities could be implemented.

In the transmitting apparatus 54, the data from the modulating means 55 and the frequency carriers with the data (and the pilot signals) from the various modulating means 58, 58', 58" are then time-interleaved by respective time interleavers 78, 78', 78" and then combined with the pilot signals to a frame pattern or structure 29 according to the present invention in a frame forming means 59. The formed frames are then transformed into time domain symbols by a frequency to time transforming means 60 and supplied to a guard interval adding means 57 which adds guard interval to the signalling and the data symbols. The thus formed transmission symbols are then transmitted by a transmitting means 61 via a transmitting interface 62.

Generally, the frame structure of the present invention could be fixed or permanent, i.e. the overall bandwidth as well as the extension of each frame in the time direction could be fixed and always the same. Alternatively, the frame structure can also be flexible, i.e. the overall bandwidth and/or the extension of each frame in the time direction could be flexible and changed from time to time depending on the desired application. For example, the number of time slots with data patterns could be flexibly changed. Hereby, the changes could be signalled to a receiving apparatus in the signalling data of the signalling patterns.

During the start-up phase or initialization phase of the receiving apparatus 63, the receiving apparatus 63 tunes to an arbitrary frequency part of the overall frequency bandwidth. In the non-limiting example of a cable broadcast system, the signalling pattern 30 could for example have a 7.61 MHz or a 8 MHz bandwidth (it has to be understood, however, that the signalling patterns could also have any other bandwidth, such as 4 MHz, 6 MHz etc.). Thus, during the start-up phase, the receiving apparatus 63 is able to receive an entire signalling pattern 30 in the original or re-ordered sequence and to perform a time synchronization in the time synchronization means 66, e.g. by performing a guard interval correlation on the guard intervals of received signalling symbols (or data symbols) or by using any other suitable technique to obtain a time synchronization. The receiving apparatus 63 further comprises the mentioned fractional frequency offset detection means 67 adapted to perform a detection and calculation of the fractional frequency offset of the received signals from fractions of the frequency carrier spacing in order to allow fractional frequency compensation. The thus obtained fractional frequency offset information could then be supplied to the tuner comprised in the receiving means 65 which then performs fractional frequency compensation. The fractional frequency compensation could also be done by other suitable techniques. After transforming the received time domain signals to the frequency domain in the time to frequency transformation means 68, the pilot signals in the received signalling patterns are used to perform a channel estimation (usually a coarse channel estimation) in the channel estimation means 69 and/or an integer frequency offset calculation. The integer frequency offset calculation is performed in an integer frequency offset detection means 74 which is adapted to detect and calculate the frequency offset of the received signals from the original frequency structure, wherein the frequency offset is counted in integer multiples of the frequency carrier spacing (thus integer frequency offset). The thus obtained integer frequency offset information could then be supplied to the tuner comprised in the receiving means 65 which then performs integer frequency compensation. The integer frequency compensation could also be done by other suitable techniques. Since the fractional frequency offset has already been calculated and compensated by means of the fractional frequency offset detection means 67, the complete frequency offset compensation can therefore be achieved. In the evaluation means 73 of the receiving apparatus 63, the received signalling data are evaluated, for example the location of the received signalling pattern in the frame is obtained so that the receiver can freely and flexibly tune to the respectively wanted frequency position, such as the part 38 is shown in FIG. 4. However, in order to be able to properly evaluate the signalling data of the signalling patterns 31 in case that the tuning position of the receiving apparatus 63 does not match with the signalling pattern structure, the received signalling signals have to be re-ordered which is performed in a re-constructing means 71 as described. FIG. 5 shows this reordering in a schematic example. The last part 31' of a previous signalling pattern is received before the first part 31" of a succeeding signalling pattern, where after the reconstructions means 71 places the part 31' after the part 31" in order to reconstruct the original sequence of the signalling data, where after the reordered signalling pattern is evaluated in the evaluation means 73 after a corresponding de-mapping of the signalling data from the frequency carriers in the de-mapping means 72. It is to be remembered that the content of each signalling pattern 31 is the same, so that this reordering is possible.

Often, a receiving apparatus does not provide a flat frequency response over the complete receiving bandwidth to which the receiver is tuned. In addition, a transmission system usually faces increasing attenuation at the boarder of the receiving bandwidth window. FIG. 6 shows a schematic representation of a typical filter shape example. It can be seen that the filter is not rectangular, so that e.g. instead of 8 MHz bandwidth, the receiving apparatus is only able to effectively receive 7.61 MHz bandwidth. The consequence is that the receiving apparatus 63 may not be able to perform the reordering of the signalling data as described in relation to FIG. 5 in case that the signalling patterns 31 have the same length and bandwidth as the receiving bandwidth of the receiving apparatus 63, so that some signals are lost and cannot be received at the border of the receiving bandwidth. In order to overcome this problem, and other problems and in order to ensure that the receiving apparatus 63 is always able to receive one complete signalling patterns in the original sequence and does not have to reorder or rearrange the received signalling signals, the present invention alternatively or additionally suggests to use signalling patterns 31a which have a reduced length as for example 7.61 MHz (or any other suitable length) as compared to the receiver bandwidth.

According to the example shown in FIG. 7, it is suggested to use signalling patterns 31a which have half the length of a receiver bandwidth, but still the same frequency structure. In other words, respective two (i.e. pairs) of the half length signalling patterns 31a are matched and aligned with the receiver bandwidth. Hereby, each pair of signalling patterns 31a would have the identical signalling data or almost identical signalling data including the (varying) location of the signalling patterns 31a in the respective frame. However, in relation to the other pairs of signalling patterns, in these other pairs, since they have a respective different location within the frame, the signalling data would be identical except the location information. In the above example of the receiving apparatus 63 having a bandwidth or length of 8 MHz, the signalling pattern 31a would then each have a length or bandwidth of 4 MHz. Hereby, in order to ensure that the same amount of signalling data as before can be transmitted, it might be necessary to add additional half length signalling patterns 31b in the time slot succeeding the signalling patterns 31a and before the data patterns 32, 34, 35, 36 and 37. The additional signalling patterns 31b have the same time and frequency arrangement/alignment as the signalling patterns 31a, but comprise additional and different signalling information as the signalling information contained in the signalling patterns 31a. In this way, the receiving apparatus 63 will be able to receive the signalling patterns 31a and 31b completely and the reconstruction means 71 of the receiving apparatus is adapted to combine the signalling data of the signalling patterns 31a and 31b to the original sequence. In this case, the reconstruction means 71 in the receiving apparatus 63 can be omitted.

It is also advantageously possible to only provide one time slot with half length signalling patterns 31a if all necessary signalling data can be transmitted in the half length and the additional signalling patterns 31b are not necessary. In this case, each signalling pattern 31a comprises the identical (or almost identical) signalling data and each received signalling pattern 31a enables the receiving apparatus 63 to always tune to and receive any wanted part of the transmission bandwidth and thus the wanted data pattern(s). Alternatively, even more half length signalling patterns could be used in the succeeding time slot after the signalling patterns 31b.

It should be generally (for all embodiments of the present invention) noted that the length (or bandwidth) of the data patterns and/or the signalling patterns could be adapted to, e.g. could be smaller than or at maximum equal to, the effective receiving bandwidth of the receiving apparatus 63, for example to the output bandwidth of the receiving band pass filter, as described above.

Further, for all embodiments of the present invention, it could be advantageous if one or more of the signalling patterns 31; 31a, 31b are succeeded in the time direction by one or more additional signalling patterns with the same length and location within the frame. For example, the first signalling pattern in a frame could have one or more additional signalling patterns in the succeeding time slots. The additional signalling patterns could hereby have the identical or almost identical signalling information as the first signalling pattern. Hereby, the other signalling patterns in a frame do not need to have additional signalling patterns. Generally, the number of signalling patterns in each frequency location within a frame could be varying. For example, it could be advantageous if in each frequency location of a frame a number of signalling patterns is provided which is necessary in view of notches or other disturbances. Alternatively or additionally, the number of signalling patterns in each frequency location within a frame could be varying depending on the amount of signalling data. Hereby, for example, if more data patterns need to be signalized, more signalling patterns could be necessary in the time direction. The length of the signalling patterns in the time direction could hereby be part of the signalling data comprised in the signalling patterns.

In a non-limiting example, the transmission and reception of the signalling data, e.g. L1 (Level 1) signalling data, and the additional pilots, which are used for integer frequency synchronization and channel equalization as well as the data patterns, is based on OFDM. The signalling data are transmitted in blocks or patterns of e.g. 4 MHz, but any other suitable size could be used. The only necessary condition is to have one complete signalling pattern within the tuning window, but this condition could be fulfilled by using two or more signalling patterns having a smaller size succeeding each other in the time direction as described in relation to FIG. 7. Therefore, the maximum bandwidth of the signalling pattern may be e.g. the tuning window of a state-of-the-art tuner, i.e. 7.61 MHz.). Some numerical examples are given in the following. In a first example, each signalling pattern 31; 31a, 31b covers exactly 4 MHz, while this corresponds to 1792 OFDM frequency carriers while having duration $T_U$ of the useful part of the OFDM symbol of 448 µs. In a second example, each signalling pattern covers 7.61 MHz (exactly 3409/448 usec), while this corresponds to 3409 OFDM carriers while having duration $T_U$ of the useful part of the OFDM symbol of 448 μs.

According to a first aspect, a pilot signal is mapped to every m-th frequency carrier 17 of a signalling pattern 31a, as schematically shown in FIG. 9 (m is an integer>1). It has to be clear, however, that this possibility equally applies to the signalling pattern 31 shown in FIG. 4, or generally to signalling patterns of any suitable length (i.e. 4 MHz, 6 MHz, 7.61 MHz, 8 MHz etc.). The frequency carriers 16 in between the pilot signal carrying frequency carriers are carrying signalling data. The mapping of the signalling data to the frequency carriers 16 and the mapping of the pilot signals 17 to every m-th frequency carrier is performed by the frequency to time transformation means 60 comprised in the transmitting apparatus 54 as shown in FIG. 14. Generally, as stated above, the pilot signals form a pilot signal sequence. Hereby, the pilots are for example modulated against each other by a modulation scheme, which could be differential, such as but not limed to D-BPSK (differential binary phase shift keying). The pilot sequence is for example obtained by means of a PRBS (pseudo random binary sequence register, e.g. 2^23-1. The repetition rate of m shall allow unambiguous D-BPSK decoding on the receiving side, such as the receiving apparatus 63 of the present invention as shown in FIG. 15, even for multi path channels. Repetition rates m are for example 7, 14, 28, . . . for 4 MHz signalling patterns since 7, 14, 28 . . . are dividers of 1792 (=number of frequency carriers in a 4 MHz signalling pattern). In this example, an advantageous repetition value is m=7. In other words, every m-th frequency carrier carries a pilot signal even across adjacent signalling patterns, i.e. the repetition rate refers to all signalling patterns and is fulfilled even from pattern to pattern, not only within the patterns. This example results in 256 pilot signals per 4 MHz signalling pattern. However, other repetition values than the above examples might be advantageous depending on the respective length of a signalling pattern and/or other factors. For example, in case of a length or a signalling pattern of 7.61 MHz (having e.g. 3408 OFDM carriers) an advantageous repetition value could be 6 or 12 (m=6 or 12), but other suitable values could be used. In case that the data pattern(s) also carry pilot signals mapped on some of the frequency carriers in between the frequency carriers with the data, it can be advantageous if the pilot signals are mapped on frequency carriers of the data pattern(s) in locations which correspond to the frequency carriers in the signalling pattern(s) on which pilot signals are mapped. Hereby, the density of the pilot signals in the data pattern(s) does not need to be as high as the density of the pilot signals in the signalling pattern(s). For example, if a pilot signal is mapped onto every m-th frequency carrier in the signalling pattern(s) (m being an integer>1), a pilot signal could be mapped onto every n-th frequency carrier of the data pattern(s), whereby n is an integer>1 and an integer multiple of m. As an advantageous example, if m=7, then n=28 (or any other suitable number). The pilot signals in the data pattern(s) could also form a pilot signal sequence as explained for the signalling pattern(s).

Regarding the creation of the pilot signal sequence for the signalling pattern(s) and the data pattern(s), which is for example a PN sequence, there are two options:

Option 1: Every signalling pattern in each frame carries a different pilot signal sequence. In the above example, the initialization of the PRBS register is aligned to the transmission frequency. 256 pilots are located within every frequency block of 4 MHz. The pilot signal sequence of each 4 MHz block is calculated separately. This allows a memory efficient implementation on receiver side.

Option 2: The pilot signal sequence is applied once for all the signalling patterns comprised in the complete transmission bandwidth or even the medium bandwidth. The receiver, e.g. the receiving apparatus 63, stores this known sequence, for example in a storage means or generates it in a suitable pilot sequence generating means, which can be part of or may be external to the integer frequency offset detection means 74, and extracts the frequency block that corresponds to its current tuning position.

As shown in FIG. 14, the pilot signals for the signalling patterns are supplied to the frame forming means 59, which combines the signalling data with the pilot signals to the signalling patterns according to the present invention. The pilot signals for a signalling data are hereby for example generated within the transmitting apparatus 54 by means of a suitable pilot signals generating means, such as but not limited to a PRBS. The generated sequence is then for example modulated by a modulation scheme, such as a binary phase shift keying modulation scheme, or a differential binary phase shift keying modulation scheme or any other, whereafter the modulated pilot signal sequence is supplied to the frame forming means 59. As mentioned, the frame forming means 59 combines the pilot signals and the signalling data to signalling patterns. Hereby, the signalling data are processed in a suitable manner, for example by error coding (as mentioned) as well as modulating, such as but not limited to a 16 QAM modulation scheme. As an additional possibility, the signalling patterns comprising the signalling data and the pilot signals, after the frame forming means 59, could be subjected to a scrambling in a corresponding scrambling means, which is adapted to scramble the pilot signals in the signalling patterns with a further PRBS generated by a suitable pseudo-random binary sequence register. This possibility could apply to the above-mentioned option 1 as well as option 2 or any other suitable implementation. The scrambling of the signalling patterns could for example be done frame by frame, or could be performed over the entire transmission bandwidth or even the entire medium bandwidth as mentioned above. In case that a pilot signal sequence is used over the entire medium bandwidth, such as mentioned in option 2 above or for the scrambling of the signalling patterns, such a pilot signal sequence could for example be generated by a suitable pseudo-random binary sequence register, which initializes the sequence at the (virtual) frequency of 0 MHz up to the upper order of the medium bandwidth, which could for example be 862 MHz or even higher depending on the implementation. The scrambled signalling patterns are then supplied to the frequency to time transformation means 60 and further processed.

All other carriers 16 within the signalling pattern are used for the transmission of the L1 signalling data. The start of the signalling data in each signalling pattern is always aligned to the 4 MHz (or 7.61 MHz or 8 MHz etc.) structure, i.e. it always starts at multiples of 4 MHz (or 7.61 MHz or 8 MHz etc.) in the depicted example. Each 4 MHz (or 7.61 MHz or 8 MHz etc.) signalling pattern may carry exactly the same information, since the pilot signal sequences or the pilot signal sequence give the receiving apparatus 63 information about the location of the respective signalling pattern in each frame. Alternatively, each signalling pattern may additionally comprise the location of the signalling pattern in the frame. Further, in order to reduce the peak-to-average power ratio of the output time domain signal, the signalling data of each signalling pattern may be scrambled in the transmitter by a unique scrambling sequence, which may be obtained by means of the signalling pattern number.

In the receiving apparatus 63, the pilot signals comprised in the signalling pattern 31; 31a, 31b are used (after a time to frequency transformation of the received time domain symbols in the time to frequency transformation means 68) in an integer frequency offset detection means 74 to detect the integer frequency offset, the result of which is then used in the receiving apparatus 63 to perform integer frequency offset compensation in the frequency domain. More specifically, the pilots signals (which are for example D-BPSK modulated) comprised in the signalling patterns within the received frequency range are (eventually after a de-scrambling) demodulated in a demodulation means 75 (which e.g. performs a D-BPSK demodulation) comprised in the integer frequency offset detection means 74. In case if a differential modulation of the pilot signals, e.g. D-BPSK, there is no need for a channel estimation for the pilots since the relatively short echoes of the channel lead to very slow changes in the frequency direction. Then, a correlation means 76 comprised in the integer frequency offset detection means 74 performs a correlation of the demodulated pilot signal (pilot signal sequences) with the stored or generated (expected) pilot signal sequence, e.g. a PRBS sequence, in order to get aligned in the exact frequency offset. The correlation is done with the PRBS sequence that is expected at the beginning of the signalling pattern (can be listed in tables on receiver side). If the sequence is found within the received symbol, a synchronization peak is obtained, the receiving apparatus 63 knows the exact frequency offset and compensate it. More specifically, the obtained integer frequency offset can be supplied to and used in the reconstructing means 71 and the de-mapping means 72 for correctly demodulating the signalling data, as well as supplied to and used in the channel estimation means 69 in order to perform the channel estimation and therefore the equalization. Also, the detection of the synchronization peak enables the detection of the beginning of a frame.

The necessary time synchronization as well as the fractional frequency offset detection and compensation are for example done in the time domain on the received time domain symbols in the time synchronization means 66 and the fractional frequency offset detection means 67 using guard interval correlation using the guard intervals of the received signalling symbols and/or data symbols (cf. FIG. 13 showing a time domain representation of a frame with signalling symbols, data symbols, and guard intervals). The time synchronization could alternatively be done by performing a correlation of the absolute values between the received time domain symbols and a receiver generated time domain symbol, in which only pilot signals are modulated. A peak in the correlation of the received symbol and the receiver generated symbol allows an exact time synchronization.

According to a second aspect which is schematically shown in FIG. 10, each signalling pattern 31a (or signalling pattern 31) comprises at least one pilot band 18, 19 comprising pilot signals mapped on the frequency carriers 20, 21 of the pilot band 18, 19. The pilot bands 18, 19 respectively comprise a number of immediately adjacent frequency carriers on which pilot signals are mapped. The pilot bands 18, 19 may each have the same number of frequency carriers or a different number of frequency carriers. Hereby, each signalling pattern 31a may comprise a pilot band 18, 19 at its beginning or at its end (in the frequency direction). Alternatively, each signalling pattern may comprise a pilot band 18, 19 at each border, i.e. at the beginning and at the end of the pattern. All other statements and definitions made above in relation to the first aspect of the present invention also apply to the second aspect, including Option 1 and Option 2. It has to be understood that the first and the second aspect could be combined, i.e. each signalling pattern may comprise at least one pilot band 18, 19 as described above as well as pilot signals mapped on every m-th frequency carrier 12.

In both aspects of the present invention described above, the relation between number of frequency carriers with pilot signals and the number of frequency carriers with signalling data in each signalling pattern might be variable and subject to the respective signalling and offset compensation requirements.

As schematically shown in FIG. 11, the transmitting apparatus 54 may blank (notch) certain regions 22, 23 of the overall transmission bandwidth in order to avoid disturbances from the cable network into other services, e.g. aircraft radio. Therefore, some part of the spectrum may not be modulated. In this case, the affected frequency carriers within the signalling pattern 31; 31a, 31b shall not be modulated as well. As the synchronization proposed by the present invention is very strong, this does not affect the frequency synchronization performance by means of the D-BPSK modulated pilots. The missing part of the signalling data is recovered by means of the repetition of the signalling data (every signalling pattern 31; 31a, 31b in a frame comprises identical or almost identical signalling data), e.g. by combining parts from two adjacent signalling patterns as shown in FIG. 11, and eventually by means of the strong error protection added to the signalling patterns by a error coding means 56 comprised in the transmitting apparatus 54. Missing parts of the signalling data at the edges of the transmission bandwidth shall be treated as very broad notches.

An alternative or additional possibility to deal with notches or other problems could be to subdivide the signalling pattern 31; 31a, 31b into two or more parts and to invert the sequence of the two or more parts in each signalling pattern (of a frame) from frame to frame. For example, if the first signalling pattern in a frame is subdivided in a first and a (succeeding) second part, the (corresponding) first signalling pattern in the immediately next frame would have the second part at the beginning and the first signalling part succeeding, i.e. an inverted sequence. Thus, if for example the second part is notched or otherwise disturbed, the receiver would have to wait for the next frame where the second part could be received without problems (since the succeeding first part would be disturbed).

An adaptation of the signalling patterns 31; 31a, 31b to different tuning bandwidths of the receiving side may for example be done by changing the distance of the frequency carriers in the signalling patterns. Alternatively, it is possible to keep the frequency carrier distance constant and to cut parts of the signalling patterns at the edges of the transmission bandwidth, e.g. by not modulating the respective frequency carriers, as schematically shown in FIG. 12, which shows the adaptation of a scheme with 4 MHz signalling patterns to a 6 MHz tuning bandwidth thus enabling the reception of data patterns having a length up to 6 MHz.

Eventually, each signalling pattern 31; 31a, 31b could additionally comprise a guard band at the beginning and the end of each pattern. Alternatively, in some applications it might be advantageous if only the first signalling pattern in each frame, in the example of FIG. 4 the signalling pattern at position 39, could comprise a guard band only at the beginning of the pattern, and the last signalling pattern in each frame could comprise a guard band only at the end of the pattern. Alternatively, in some applications only the first signalling pattern in each frame, in the example of FIG. 4 the signalling pattern at position 39, could comprise a guard band at the beginning as well as at the end of the pattern, and the last signalling pattern in each frame could comprise a guard band at the beginning as well as at end of the pattern. The length of the guard band comprised in some or all of the signalling patterns could for example be smaller or at maximum equal to the maximum frequency offset the receiving apparatus can cope with. In the mentioned example of a receiver bandwidth of 8 MHz, the guard band could for example have a length of 250 to 500 kHz or any other suitable length. Also, the length of each of the guard bands comprised in the signalling patterns could be at least the length of the carriers which are not received in the receiving apparatus due to the filter characteristics as described in relation to FIG. 6.

For example, in an OFDM system in which the overall transmission bandwidth is a multiple of 8 MHz (4nk mode: k is the Fourier window size of 1024 carriers/samples, n=1, 2, 3, 4 . . . ) and each signalling pattern has a length of 4 MHz, a suggestion for the length of each guard band at the beginning and the end of each signalling pattern would be 343 frequency carriers (which is the number of not used carriers in the data patterns at the beginning and end of each frame in each 4nk mode). The resulting number for usable carriers in each signalling pattern would be 3584/2−2×343=1106 carriers. It has to be understood, however, that these numbers are only used as examples and are not meant to be limiting in any sense. Hereby, the length of each of the guard bands comprised in the signalling patterns could be at least the length of the carriers which are not received in the receiving apparatus due to the filter characteristics as described in relation to FIG. 6, so that the length of the signalling data in each signalling pattern is equal to (or may be smaller than) the effective receiver bandwidth. It should be noted that if additional signalling patterns 31b are present, they will have identical guard bands as the signalling patterns 31a.

Additionally or alternatively, each data pattern could comprise a guard band with unused carriers at the beginning and the end of each pattern. Alternatively, in some applications only the respective first data patterns in each frame in the frequency direction, in the example of FIGS. 10 and 13 the data patterns 32, 32', 32'', 32''', 32'''' could comprise a guard band only at the beginning of the data pattern, and the last data patterns in each frame in the frequency direction, in the example of FIGS. 4 and 7 the data patterns 37, 37', 37'', 37''', 37'''' could comprise a guard band at the end of the data pattern. Hereby, the length of the guard bands of the data patterns could for example be the same as the length of the guard bands of the signalling patterns if the signalling patterns comprise guard bands.

As stated above the signalling data comprised in the signalling patterns 31, 31a and or 31b (or other signalling patterns according to the present invention) comprise the physical layer information, which enables a receiving apparatus 63 according to the present invention to obtain knowledge about the frame structure and to receive and decode the wanted data patterns. As a non limiting example, the signalling data could comprise parameters such as the overall or entire transmission bandwidth, the location of the respective signalling pattern within the frame, the guard band length for the signalling patterns, the guard band length for the data patterns, the number of frames which build a super frame, the number of the present frame within a super frame, the number of data patterns in the frequency dimension of the overall frame bandwidth, the number of additional data patterns in the time dimension of a frame and/or individual signalling data for each data pattern in each frame. Hereby, the location of the respective signalling pattern within a frame can e.g. indicate the position of the signalling pattern in relation to the segmentation of the overall bandwidth. For example, in the case of FIG. 4, the signalling data comprise indication if the signalling pattern is located in the first segment (e.g. the first 8 MHz segment), or the second segment etc. In case of the signalling patterns having half the length of the bandwidth segmentation, as e.g. explained in relation to FIG. 7, each pair of adjacent signalling patterns then has the same location information. In any case, the receiving apparatus will be able to tune to the wanted frequency band in the succeeding frame using this location information. The individual signalling data are a separate block of data individually provided for each data pattern present in the frame and may comprise parameters such as the first frequency carrier of the data pattern, the number of frequency carriers allocated to the data pattern (or the length of a data pattern in terms of multiples of the minimum data pattern length in the frequency direction), the modulation used for the data pattern (could also be included in signalling data embedded in the data patterns), the error protection code used for the data pattern (could also be included in signalling data embedded in the data patterns), the usage of a time interleaver for the data pattern, the number of frequency notches (frequency carriers which are not used for data transmission in data pattern) in the data pattern, the position of the frequency notches and/or the width of the frequency notches. The transformation means 60 of the transmitting apparatus 54 is adapted to map the corresponding signalling data on the frequency carriers of each signalling pattern. The evaluation means 73 of the receiving apparatus 63 is adapted to evaluate the received signalling data and to use or forward the information comprised in the signalling data for further processing within the receiving apparatus 63.

In case that the signalling data comprise the mentioned individual signalling information for each data pattern present in a frame, the structure of the signalling patterns support a maximum limited number of data patterns in the frequency direction per frame in order to restrict the size of each signalling pattern to a maximum size. Thus, although the number of data patterns in the frequency direction of each frame could be dynamically and flexible changed, this would then be true only within a certain maximum number of data patterns. The additional data patterns in the time direction of each frame are respectively aligned with the preceding data patterns, as explained above. Thus, each additional succeeding data pattern has the same position, length, modulation etc. as the preceding data pattern so that the signalling data for the preceding data pattern are also valid for the succeeding data pattern. Hereby, the number of additional data patterns in the time direction of each frame could be fixed or flexible and this information could also be comprised in the signalling data. Similarly, the structure of the signalling patterns could support only a maximum limited number of frequency notches in each data pattern.

Alternatively or additionally, in order to overcome the problem that parts of the signalling patterns 31 may not be receivable in the receiving apparatus 63, the transmitting apparatus 54 could optionally comprise an error coding means 56 adapted to add some kind of error coding, redundancy, such as repetition coding, cyclic redundancy coding, or the like to the signalling data which are arranged in a signalling pattern by the frame forming means 59. The additional error coding would enable the transmitting apparatus 54 to use signalling patterns 31 in the same length as the training patterns 30, as shown in FIG. 4 since the receiving apparatus 63 is able, for example, by means of the reconstruction means 71, to perform some kind of error detection and/or correction in order to reconstruct the original signalling pattern.

For the mentioned example of the signalling patterns having a length of 4 MHz and are aligned to segments of 8 MHz in an OFDM system, in the following a specific (non-limiting) example of a signalling structure is described.

For an OFDM symbol duration of 448 µs, each 4 MHz block is built by 1792 OFDM subcarriers. If a frequency domain pilot is used on every $7^{th}$ OFDM carrier within the signalling symbols 1536 OFDM carriers remain for the transmission of the L1 signalling data within each signalling OFDM symbol.

These OFDM carriers may be e.g. modulated by 16QAM, resulting in gross 6144 transmittable bits within the L1 signalling. Part of the transmittable bits have to be used for error correcting purposes, e.g. for a LDPC or Reed Solomon code. The remaining net bits are then used for the signalling, e.g. as described in the table below.

---

GI Length
Frame number
Total bandwidth
Total number of data slices
L1 sub-signalling table number
Number of sub-tabled data slices
Loop over data slices {
    Data slice number
    Tuning position
    Start subcarrier frequency
    Number of subcarriers per slice
    Power reduction
    Time Interleaver depth
    Notch indicator
    PSI/SI reprocessing
    Number of notches
} End data slice loop
Loop over notches {
    Start carrier of notch
    Notch width
} End notch loop
Reserved bits
CRC_32

---

In the following, the parameters of the signalling data mentioned in the above table are described in more detail:

GI Length:
    Defines the length of used Guard Interval
Frame Number:
    Counter which is increased every frame, i.e. each signalling symbol
Total bandwidth:
    The complete transmission bandwidth of the used channel
Total Number of Data Slices:
    This parameter signals the total number of data slices, i.e. data patterns, in the used channel
L1 Sub-Signalling Table Number:
    Number of the sub-signalling table within the signalling data
Number of sub-tabled data slices:
    Number of data slices that are signalized within this L1 signalling table
Data Slice Number:
    Number of the current data slice
Tuning Position:
    This parameter indicates the position (frequency) of the tuning bandwidth (e.g. center frequency, start frequency or the like of the tuning bandwidth)

Start Subcarrier Frequency:
    Start frequency of the data slice (e.g. in integer multiples of the minimum data pattern length), e.g. in absolute carrier number or in relation to tuning position
Number of Subcarriers Per Slice:
    Number of subcarriers per data slice (e.g. in integer multiples of the minimum data pattern length), or as last carrier number or in relation to tuning position
Notch Indicator:
    This parameter indicates the presence of a neighboured notch
Power Reduction:
    This field indicates the power level of the data field (e.g. full power, power reduced by 3 dB, 6 dB, etc)
Time Interleaver Depth:
    Time interleaving depth within the current data slice
PSI/SI Reprocessing:
    Signalizes, whether PSI/SI reprocessing has been performed in the transmitter for the current data slice
Number of Notches:
    Number of notches within the current data slice
Start Carrier of Notch:
    Start position of the notch (e.g. in integer multiples of the minimum data pattern length), e.g. in absolute carrier number
Notch Width:
    Width of the Notch
Reserved Bits:
    Reserved bits for future use
CRC_32:
    32 bit CRC coding for the L1 signalling block In order to ensure an even better reception of the signalling patterns in the receiving apparatus 63, the present invention further suggests to optimize the tuning position of the receiving apparatus 63. In the examples shown in FIGS. 4 and 7, the receiver is tuned to a part 38 of the transmission bandwidth by centering the part 38 around the frequency bandwidth of the data patterns to be received. Alternatively, the receiving apparatus 63 could be tuned so that the reception of the signalling pattern 31 is optimized by placing the part 38 so that a maximum part of a signalling pattern 31 is received while the wanted data pattern is still fully received. Alternatively, the length of the respective data patterns could not differ from the length of the respective signalling patterns 31 by more than a certain percentage for example 10%. An example for this solution can be found in FIG. 8. The borders between the data patterns 42, 43, 44 and 45 are (in the frequency direction) not deviating from the borders between the signalling patterns 31 by more than a certain percentage, such as (but not limited to) 10%. This small percentage can then be corrected by the above-mentioned additional error coding in the signalling patterns 31.

FIG. 13 shows a time domain representation of an example of frame 47 according to the present invention. In the transmitting apparatus 54, after the frame pattern or structure was generated in the frame forming means 59, the frequency domain frame pattern is transformed into the time domain by a frequency to time transforming means 60. An example of a resulting time domain frame is now shown in FIG. 13 and comprises a guard interval 49, a signalling symbol 50, a further guard interval 51 and a number of data symbols 52, which are respectively separated by guard intervals 53. While the situation that only a single signalling symbol is present in the time domain corresponds to the example shown in FIG. 4, where only a single time slot with signalling patterns is present in the frequency domain frame structure, the example of FIG. 7 with two time slots with signalling patterns 31*a* and 31b, respectively, would lead to the presence of two signalling patterns in the time domain, which are eventually separated by a guard interval. The guard intervals could e.g. be cyclic extensions of the useful parts of the respective symbols. In the example of an OFDM system, the signalling symbols and the data symbols, including their eventually provided guard bands, could respectively have the length of one OFDM symbol. The time domain frames are then forwarded to a transmitting means 61 which processes the time domain signal depending on the used multi-carrier system, for example by up-converting the signal to the wanted transmission frequency. The transmission signals are then transmitted via a transmitting interface 62, which can be a wired interface or a wireless interface, such as an antenna or the like. As mentioned above, the signalling patterns(s) could be preceded by one or more training patterns, which would lead to the presence of a training symbol preceding the signalling symbol in the time domain.

FIG. 13 further shows that a respective number of frames could be combined to super frames. The number of frames per super frame, i.e. the length of each super frame in the time direction, could be fixed or could vary. Hereby, there might be a maximum length up to which the super frames could be set dynamically. Further, it might be advantageous if the signalling data in the signalling patterns for each frame in a super frame are the same and if changes in the signalling data only occur from super frame to super frame. In other words, the modulation, coding, number of data patterns etc. would be the same in each frame of a super frame, but could then be different in the succeeding super frame. For example, the length of the super frames in broadcast systems could be longer since the signalling data might not change as often, and in interactive systems the super frame length could be shorter since an optimization of the transmission and reception parameters could be done on the basis of feedback from the receiver to the transmitter. As mentioned, a training symbol could precede each signalling symbol in each frame.

The elements and functionalities of the transmitting apparatus 54, a block diagram of which is shown in FIG. 14, have been explained before. It has to be understood, that an actual implementation of a transmitting apparatus 54 will contain additional elements and functionalities necessary for the actual operation of the transmitting apparatus in the respective system. In FIG. 14, only the elements and means necessary for the explanation and understanding of the present invention are shown. The same is true for the receiving apparatus 63, a block diagram of which is shown in FIG. 15. FIG. 15 only shows elements and functionalities necessary for the understanding of the present invention. Additional elements will be necessary for an actual operation of the receiving apparatus 63. It has to be further understood that the elements and functionalities of the transmitting apparatus 54 as well as the receiving apparatus 63 can be implemented in any kind of device, apparatus, system and so forth adapted to perform the functionalities described and claimed by the present invention.

It is to be noted that the present invention is intended to cover a frame structure (and a correspondingly adapted transmitting and receiving apparatus and method as described above), which, as an alternative to the above described embodiments, does have a number (two or more) data patterns in which at least one data pattern has a length which is different from the length of the other data pattern(s). This structure of data patterns with a variable length can be combined either with a sequence of signalling patterns with identical lengths and (identical or almost identical) contents as described above, or with a sequence of signalling patterns in which at least one signalling pattern has a length and/or a content different from the other signalling patterns, i.e. a variable signalling pattern length. In both cases, the receiving apparatus 63 will need some information about the varying data pattern length, which could be transmitted by means of a separate signalling data channel or by means of signalling data comprised in signalling data patterns comprised in the frame structure as described above. In the later case, it might be a possible implementation if the first signalling patterns in each frame always have the same length so that the receiving apparatus can always obtain the information about the varying data patterns by receiving the first signalling patterns in every or the necessary frames. Of course, other implementations might be possible. Otherwise, the rest of the above description in relation to the data patterns and the signalling patterns as well as the possible implementations in the transmitting apparatus 54 and the receiving apparatus 63 is still applicable.

The invention claimed is:

1. A transmitting apparatus for transmitting signals in a multi carrier system on the basis of a frame structure, said transmitting apparatus comprising:
   a frame former that forms frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, that arranges signaling data in each of said at least two signaling patterns in a frame, and that arranges data and at least one pilot signal in said one or more data patterns in the frame, wherein a length of each of said one or more data patterns in the frequency direction is equal to or a multiple of a minimum data pattern length;
   a transformer that transforms said at least two signaling patterns and said one or more data patterns from the frequency domain into the time domain to generate a time domain transmission signal; and
   a transmitter that transmits said time domain transmission signal.

2. The transmitting apparatus according to claim 1, wherein said signaling data comprise a length of the one or more data patterns on the basis of the minimum data pattern length.

3. The transmitting apparatus according to claim 1, wherein a number of scattered pilot signals in each data pattern is directly proportional to a number of minimum data patterns lengths of the respective data pattern.

4. The transmitting apparatus according to claim 1, wherein the pilot signals in said pilot signal pattern have a regular spacing in the frequency direction, wherein the minimum data pattern length corresponds to a spacing between two adjacent pilot signals in the frequency direction.

5. The transmitting apparatus according to claim 1, wherein each data pattern has a same length in the time direction.

6. The transmitting apparatus according to claim 5,
wherein the length of each data pattern in the time direction corresponds to a spacing between two adjacent scattered pilot signals in the time direction.

7. A transmitting method for transmitting signals in a multi carrier system on the basis of a frame structure, the method comprising:
forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data pattern comprising a plurality of frequency carriers;
arranging signaling data in each of said at least two signaling patterns in a frame;
arranging data and at least one pilot signal in said one or more data patterns in the frame, wherein a length of each of said one or more data patterns in the frequency direction is equal to or a multiple of a minimum data pattern length;
transforming said at least two signaling patterns and said one or more data patterns from the frequency domain into the time domain in order to generate a time domain transmission signal; and
transmitting said time domain transmission signal.

8. A receiving apparatus for receiving signals in a multi carrier system on the basis of a frame structure in a transmission bandwidth, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, wherein each frame comprises signaling data in each of said at least two signaling patterns and one or more data patterns with data and pilot signals, wherein a length of each of said one or more data patterns in the frequency direction is equal to or a multiple of a minimum data pattern length, said receiving apparatus comprising
a receiver configured to be tuned to and to receive a selected part of said transmission bandwidth, said selected part of said transmission bandwidth covering at least one data pattern to be received;
a channel estimator that performs a channel estimation on the basis of pilot signals comprised in a received data pattern; and
a data de-mapper that de-maps data from frequency carriers of the received data pattern on the basis of a result of said channel estimation.

9. The receiving apparatus according to claim 8,
wherein each frame comprises at least one signaling pattern having signaling data, said signaling data comprising a length of each of said one or more data patterns in reference to said minimum data pattern length; and
said receiving apparatus further comprises an evaluator configured to extract said length from received signaling data.

10. The receiving apparatus according to claim 8,
wherein a number of scattered pilot signals in each received data pattern is directly proportional to a number of minimum data patterns lengths comprised in said received data pattern, wherein said channel estimator performs a channel estimation on the basis of said pilot signals.

11. The receiving apparatus according to claim 8,
wherein the pilot signals in the one or more data patterns of a frame are arranged in pilot signal patterns, in which the pilot signals have a regular spacing in the frequency dimension direction, wherein the minimum data pattern length corresponds to a spacing between two adjacent pilot signals in the frequency direction.

12. The receiving apparatus according to claim 8,
wherein each data pattern has a same length in the time direction, wherein the length of the data patterns in the time direction corresponds to a spacing between two adjacent scattered pilot signals in the time direction.

13. The receiving apparatus according to claim 8, further comprising a time de-interleaver that performs a block wise time de-interleaving on received data patterns with a block length corresponding to a multiple of the data pattern length in the time direction.

14. A receiving method for receiving signals in a multi carrier system on the basis of a frame structure in a transmission bandwidth, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, wherein each frame comprises signaling data in each of said at least two signaling patterns and one or more data patterns with data and pilot signals, wherein a length of each of said one or more data patterns in the frequency direction is equal to or a multiple of a minimum data pattern length, the method comprising:
receiving a selected part of said transmission bandwidth, said selected part of said transmission bandwidth covering at least one data pattern to be received;
performing a channel estimation on the basis of pilot signals included in a received data pattern; and
de-mapping data from frequency carriers of the received data pattern on the basis of the result of said channel estimation.

15. A system for transmitting and receiving signals, comprising:
a transmitting apparatus, said transmitting apparatus including
a frame former that forms frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, that arranges signaling data in each of said at least two signaling patterns in a frame, and that arranges data and at least one pilot signal in said one or more data patterns in the frame, wherein a length of each of said one or more data patterns in the frequency direction is equal to or a multiple of a minimum data pattern length;

a transformer that transforms said at least two signaling patterns and said one or more data patterns from the frequency domain into the time domain to generate a time domain transmission signal;

a transmitter that transmits said time domain transmission signal; and that receives said time domain transmission signal from said transmitting apparatus.

16. A method for transmitting and receiving signals, comprising:

a transmitting method, including forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data pattern comprising a plurality of frequency carriers;

arranging signaling data in each of said at least two signaling patterns in a frame;

arranging data and at least one pilot signal in said one or more data patterns in the frame, wherein a length of each of said one or more data patterns in the frequency direction is equal to or a multiple of a minimum data pattern length;

transforming said at least two signaling patterns and said one or more data patterns from the frequency domain into the time domain in order to generate a time domain transmission signal;

transmitting said time domain transmission signal; and a receiving method according to claim 14.

17. A transmitting apparatus for transmitting signals in a multi carrier system on the basis of a frame structure, said transmitting apparatus comprising:

means for forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, for arranging signaling data in each of said at least two signaling patterns in a frame, and for arranging data and at least one pilot signal in said one or more data patterns in a frame, wherein a length of each of said one or more data patterns in the frequency direction is equal to or a multiple of a minimum data pattern length;

means for transforming said at least two signaling patterns and said one or more data patterns from the frequency domain into the time domain in order to generate a time domain transmission signal; and means for transmitting said time domain transmission signal.

18. A receiving apparatus for receiving signals in a multi carrier system on the basis of a frame structure in a transmission bandwidth, each frame comprising at least two signaling patterns adjacent to each other in a frequency direction and one or more data patterns following the at least two signaling patterns in a time direction in the time slot immediately succeeding the time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, wherein each frame comprises signaling data in each of said at least two signaling patterns and one or more data patterns with data and pilot signals, wherein a length of each of said one or more data patterns in the frequency direction is equal to or a multiple of a minimum data pattern length, said receiving apparatus comprising:

means for tuning and receiving a selected part of said transmission bandwidth, said selected part of said transmission bandwidth covering at least one data pattern to be received;

means for performing a channel estimation on the basis of pilot signals comprised in a received data pattern; and means for de-mapping data from frequency carriers of the received data pattern on the basis of the result of said channel estimation.

19. A system for transmitting and receiving signals, comprising a transmitting apparatus for transmitting signals in a multi carrier system on the basis of a frame structure, said transmitting apparatus including:

means for forming frames of said frame structure, each frame comprising at least two signaling patterns adjacent to each other in a frequency direction and one or more data patterns following the at least two signaling patterns in a time direction in a time slot immediately succeeding a time slot in which the at least two signaling patterns are located, wherein each of the data patterns succeeding the at least two signaling patterns is respectively followed by further data patterns in succeeding time slots in the time direction, wherein all data patterns following each other in the time direction have a same frequency direction structure, each of the at least two signaling patterns and the one or more data patterns comprising a plurality of frequency carriers, for arranging signaling data in each of said at least two signaling patterns in a frame, and for arranging data and at least one pilot signal in said one or more data patterns in a frame, wherein a length of each of said one or more data patterns in the frequency direction is equal to or a multiple of a minimum data pattern length;

means for transforming said at least two signaling patterns and said one or more data patterns from the frequency domain into the time domain in order to generate a time domain transmission signal;

means for transmitting said time domain transmission signal; and a receiving apparatus according to claim 18 for receiving said time domain transmission signal from said transmitting apparatus.

* * * * *